United States Patent
Ma

(10) Patent No.: US 12,175,718 B2
(45) Date of Patent: Dec. 24, 2024

(54) METHOD FOR LOCATING IMAGE REGION, MODEL TRAINING METHOD, AND RELATED APPARATUS

(71) Applicant: Tencent Technology (Shenzhen) Company Limited, Shenzhen (CN)

(72) Inventor: Lin Ma, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 568 days.

(21) Appl. No.: 17/319,028

(22) Filed: May 12, 2021

(65) Prior Publication Data

US 2021/0264227 A1    Aug. 26, 2021

Related U.S. Application Data

(63) Continuation of application No. PCT/CN2020/078532, filed on Mar. 10, 2020.

(30) Foreign Application Priority Data

Mar. 13, 2019   (CN) .......................... 201910190207.2

(51) Int. Cl.
*G06V 10/25*    (2022.01)
*G06F 18/214*   (2023.01)
(Continued)

(52) U.S. Cl.
CPC ............ *G06V 10/25* (2022.01); *G06F 18/214* (2023.01); *G06F 18/22* (2023.01); *G06N 3/04* (2013.01);
(Continued)

(58) Field of Classification Search
CPC ...... G06V 10/82; G06V 10/454; G06V 10/25; G06V 10/426; G06T 7/11; G06T 7/73
See application file for complete search history.

(56) References Cited

U.S. PATENT DOCUMENTS 9,436,760 B1 *  9/2016  Tacchi ................ G06F 16/9024
2018/0121768 A1 *  5/2018  Lin .................... G06F 18/24133
(Continued)

FOREIGN PATENT DOCUMENTS

CN    106845499 A    6/2017
CN    108228757 A    6/2018
(Continued)

OTHER PUBLICATIONS

Zhang et al., "MAN: Moment Alignment Network for Natural Language Moment Retrieval via Iterative Graph Adjustment," https://doi.org/10.48550/arXiv.1812.00087. (Year: 2018).*
(Continued)

*Primary Examiner* — Ross Varndell
(74) *Attorney, Agent, or Firm* — Morgan, Lewis & Bockius LLP

(57) ABSTRACT

The present disclosure provides a method for locating an image region. The method comprises determining one or more regions in an image. Each of the regions corresponding to a respective candidate object in the image. The method comprises generating respective semantic information having a one-to-one correspondence with a corresponding candidate object in each of the regions. The method comprises obtaining respective enhanced semantic information corresponding to the respective semantic information using a graph convolutional network (GCN). A matching degree between a text feature set corresponding to a to-be-located text and each of the respective enhanced semantic information is obtained using an image region locating network model. The method further comprises determining a target image candidate region from the one or more regions according to the matching degree between the text feature set and each of the respective enhanced semantic information.

14 Claims, 6 Drawing Sheets

(51) Int. Cl.
  *G06F 18/22*   (2023.01)
  *G06N 3/04*    (2023.01)
  *G06V 10/44*   (2022.01)
  *G06V 10/82*   (2022.01)
  *G06V 10/84*   (2022.01)
  *G06V 30/262*  (2022.01)
  *G06V 30/418*  (2022.01)

(52) U.S. Cl.
  CPC ............ *G06V 10/454* (2022.01); *G06V 10/82* (2022.01); *G06V 10/84* (2022.01); *G06V 30/274* (2022.01); *G06V 30/418* (2022.01)

(56) References Cited

U.S. PATENT DOCUMENTS

2020/0193160 A1* 6/2020 Lee .................. G06F 40/30
2021/0192730 A1* 6/2021 Raciti ................ G06V 10/82

FOREIGN PATENT DOCUMENTS

| CN | 108229287 A | 6/2018 |
| CN | 108960330 A | 12/2018 |
| CN | 109002852 A | 12/2018 |
| CN | 109903314 A | 6/2019 |
| JP | 2017168855 A | 9/2017 |
| JP | 2020112808 A | 7/2020 |

OTHER PUBLICATIONS

Tencent Technology, ISR, PCT/CN2020/078532, May 27, 2020, 2 pgs.
Tencent Technology, WO, PCT/CN2020/078532, May 27, 2020, 5 pgs.
Tencent Technology, IPRP, PCT/CN2020/078532, Aug. 25, 2021, 6 pgs.
Tencent Technology, Korean Office Action, KR Patent Application No. 10-2021-7014824, Sep. 1, 2023, 5 pgs.
Da Zhang et al., "Man: Moment Alignment Network for Natural Language Moment Retrieval via Iterative Graph Adjustment", arxiv.org, Cornell University Library, Ithaca, NY 14853, Nov. 30, 2018, XP080987656, 11 pgs.
Extended European Search Report, EP20771005.4, Apr. 11, 2022, 12 pgs.
Tencent Technology (Shenzhen) Company Limited, JP 2021-546041, Decision to Grant a Patent, Jun. 3, 2022, 5 pgs.

\* cited by examiner

METHOD FOR LOCATING IMAGE REGION, MODEL TRAINING METHOD, AND RELATED APPARATUS

CROSS REFERENCE TO RELATED APPLICATIONS

This application is a continuation application of PCT Patent Application No. PCT/CN2020/078532, entitled "IMAGE REGION POSITIONING METHOD, MODEL TRAINING METHOD, AND RELATED APPARATUS" filed on Mar. 10, 2020, which claims priority to Chinese Patent Application No. 201910190207.2, filed with the State Intellectual Property Office of the People's Republic of China on Mar. 13, 2019, and entitled "METHOD FOR LOCATING IMAGE REGION, MODEL TRAINING METHOD, AND RELATED APPARATUS", all of which are incorporated herein by reference in their entirety.

FIELD OF THE TECHNOLOGY

Embodiments of the present disclosure relate to a method for locating an image region, a model training method, and a related apparatus.

BACKGROUND OF THE DISCLOSURE

With the ongoing development of artificial intelligence, it becomes an important task for machine learning to locate a region corresponding to a natural sentence in an image. When there are a large number of images, it usually takes a lot of time to artificially extract regions associated with natural sentences, and errors are likely to occur. Therefore, it is very necessary to locate image regions by using machines.

At present, in a method for locating an image region, a plurality of candidate regions in an image are first extracted in an object proposal manner, and a matching model is then used to determine a matching relationship between each object proposal and a natural language, to further select a local region that best matches a natural language as a target image region, thereby completing a corresponding task of natural sentence image locating.

SUMMARY

According to one aspect of the present disclosure, a method for locating an image region is provided. The method comprises:
  determining one or more regions in an image, each of the regions corresponding to a respective candidate object in the image;
  generating respective semantic information having a one-to-one correspondence with a corresponding candidate object in each of the regions;
  obtaining respective enhanced semantic information set corresponding to the respective semantic information using a graph convolutional network (GCN), each of the respective enhanced semantic information having a one-to-one correspondence with the respective semantic information, the GCN being configured to build an association relationship between various pieces of semantic information;
  obtaining a matching degree between a text feature set corresponding to a to-be-located text and each of the respective enhanced semantic information using an image region locating network model, the image region locating network model being configured to determine a matching relationship between the image candidate region and the to-be-located text, each word in the to-be-located text corresponding to one word feature in the text feature set; and
  determining a target image candidate region from the one or more regions according to the matching degree between the text feature set and each of the respective enhanced semantic information.

According to another aspect of the present disclosure, a model training method is provided, including:
  obtaining a to-be-trained text set and a to-be-trained image candidate region set, the to-be-trained text set including a first to-be-trained text and a second to-be-trained text, the to-be-trained image candidate region set including a first to-be-trained image candidate region and a second to-be-trained image candidate region, the first to-be-trained text and the first to-be-trained image candidate region having a matching relationship, the first to-be-trained text and the second to-be-trained image candidate region having no matching relationship, the second to-be-trained text and the second to-be-trained image candidate region having a matching relationship, the second to-be-trained text and the first to-be-trained image candidate region having no matching relationship;
  determining a target loss function according to the first to-be-trained text, the second to-be-trained text, the first to-be-trained image candidate region, and the second to-be-trained image candidate region; and
  training a to-be-trained image region locating network model by using the target loss function, to obtain an image region locating network model, the image region locating network model being configured to determine a matching relationship between an image candidate region and a to-be-located text according to a text feature set and enhanced semantic information, the enhanced semantic information and the image candidate region having a correspondence, the text feature set and the to-be-located text having a correspondence.

According to another aspect of the present disclosure, an apparatus for locating an image region is provided, including:
  a generation module, configured to generate a region semantic information set according to an image candidate region set in a to-be-located image, each piece of region semantic information in the region semantic information set corresponding to one image candidate region in the image candidate region set;
  an obtaining module, configured to obtain, by using a GCN, an enhanced semantic information set corresponding to the region semantic information set generated by the generation module, each piece of enhanced semantic information in the enhanced semantic information set corresponding to one piece of region semantic information in the region semantic information set, the GCN being configured to build an association relationship between various pieces of region semantic information;
  the obtaining module, further configured to obtain a matching degree between a text feature set corresponding to a to-be-located text and the each piece of enhanced semantic information by using an image region locating network model, the image region locating network model being configured to determine a matching relationship between the image candidate region and the to-be-located text, each word in the to-be-located text corresponding to one word feature in the text feature set; and a determining module, configured to determine a target image candidate region from the image candidate region set according to the matching degree between the text feature set and the each piece of enhanced semantic information obtained by the obtaining module.

According to another aspect of the present disclosure, a model training apparatus is provided, including:

an obtaining module, configured to obtain a to-be-trained text set and a to-be-trained image candidate region set, the to-be-trained text set including a first to-be-trained text and a second to-be-trained text, the to-be-trained image candidate region set including a first to-be-trained image candidate region and a second to-be-trained image candidate region, the first to-be-trained text and the first to-be-trained image candidate region having a matching relationship, the first to-be-trained text and the second to-be-trained image candidate region having no matching relationship, the second to-be-trained text and the second to-be-trained image candidate region having a matching relationship, the second to-be-trained text and the first to-be-trained image candidate region having no matching relationship;

a determining module, configured to determine a target loss function according to the first to-be-trained text, the second to-be-trained text, the first to-be-trained image candidate region, and the second to-be-trained image candidate region obtained by the obtaining module; and a training module, configured to train a to-be-trained image region locating network model by using the target loss function determined by the determining module, to obtain an image region locating network model, the image region locating network model being configured to determine a matching relationship between an image candidate region and a to-be-located text according to a text feature set and enhanced semantic information, the enhanced semantic information and the image candidate region having a correspondence, the text feature set and the to-be-located text having a correspondence.

According to another aspect of the present disclosure, a terminal device (e.g., a computing device) is provided, including: a memory, a transceiver, a processor, and a bus system;

the memory being configured to store a program;

the processor being configured to execute the program in the memory to perform the following operations:

determining one or more regions in an image, each of the regions corresponding to a respective candidate object in the image;

generating respective semantic information having a one-to-one correspondence with a corresponding candidate object in each of the regions;

obtaining respective enhanced semantic information corresponding to the respective semantic information using a GCN, each of the respective enhanced semantic information having a one-to-one correspondence with the respective semantic information, the GCN being configured to build an association relationship between various pieces of semantic information;

obtaining a matching degree between a text feature set corresponding to a to-be-located text and each of the respective enhanced semantic information using an image region locating network model, the image region locating network model being configured to determine a matching relationship between the image candidate region and the to-be-located text, each word in the to-be-located text corresponding to one word feature in the text feature set; and determining a target image candidate region from the one or more regions according to the matching degree between the text feature set and each of the respective enhanced semantic information; and the bus system being configured to connect the memory and the processor to enable the memory and the processor to perform communication.

In some implementations, the processor is configured to execute the program in the memory to perform the following operations:

obtaining the region semantic information corresponding to each image candidate region by using a convolutional neural network (CNN), the image candidate region including region information, the region information including position information of the image candidate region in the to-be-located image and size information of the image candidate region; and generating the region semantic information set according to the N pieces of region semantic information when region semantic information corresponding to N image candidate regions is obtained, N being an integer greater than or equal to 1.

In some implementations, the processor is configured to execute the program in the memory to perform the following operations:

obtaining first region semantic information and second region semantic information from the region semantic information set, the first region semantic information being any one piece of region semantic information in the region semantic information set, the second region semantic information being any one piece of region semantic information in the region semantic information set;

obtaining strength of a connecting edge between the first region semantic information and the second region semantic information;

normalizing the strength of the connecting edge between the first region semantic information and the second region semantic information, to obtain normalized strength;

determining a target connection matrix according to normalized strength between the various pieces of region semantic information in the region semantic information set; and determining the enhanced semantic information set corresponding to the target connection matrix by using the GCN.

In some implementations, the processor is configured to execute the program in the memory to perform the following operations:

generating a connection matrix according to the normalized strength between the various pieces of region semantic information in the region semantic information set; and generating the target connection matrix according to the connection matrix and an identity matrix.

In some implementations, the processor is configured to execute the program in the memory to perform the following operation:

calculating the enhanced semantic information set in the following manner:

$$n_i^k = \sum_{j \in neighboring(i)} (w_j^k(n_j^{k-1}) + b_j^k)E_{ij},$$

where $n_i^k$ represents an $i^{th}$ piece of enhanced semantic information corresponding to a $k^{th}$ layer of GCN, $n_j^{k-1}$ represents a $j^{th}$ piece of enhanced semantic information corresponding to a $(k-1)^{th}$ layer of GCN, $w_j^k$ represents a first network parameter of the $k^{th}$ layer of GCN, $b_j^k$ represents a second network parameter of the $k^{th}$ layer of GCN, $j \in$ neighboring(i) represents that a $j^{th}$ node is a neighboring node of an $i^{th}$ node, and $E_{ij}$ represents an element in the target connection matrix.

In some implementations, the processor is configured to execute the program in the memory to perform the following operations:

obtaining the to-be-located text;

obtaining a text vector sequence according to the to-be-located text, the text vector sequence including T word vectors, each word vector corresponding to one word, T being an integer greater than or equal to 1;

encoding each word vector in the text vector sequence, to obtain a text feature; and generating the text feature set according to the T text features when text features corresponding to the T word vectors are obtained.

In some implementations, the processor is configured to execute the program in the memory to perform the following operation:

obtaining the text feature in the following manner:

$$h_t = LSTM(w_t, h_{t-1}),$$

where $h_t$ represents a $t^{th}$ text feature in the text feature set, LSTM( ) represents performing encoding by using a Long Short-Term Memory (LSTM) network, $w_t$ represents a $t^{th}$ word vector in the text vector sequence, and $h_{t-1}$ represents a $(t-1)^{th}$ text feature in the text feature set.

According to another aspect of the present disclosure, a server is provided, including a memory, a transceiver, a processor, and a bus system;

the memory being configured to store a program;

the processor being configured to execute the program in the memory to perform the following operations:

determining one or more regions in an image, each of the regions corresponding to a respective candidate object in the image;

generating respective semantic information having a one-to-one correspondence with a corresponding candidate object in each of the regions;

obtaining respective enhanced semantic information corresponding to the respective semantic information using a GCN, each of the respective enhanced semantic information having a one-to-one correspondence with the respective semantic information, the GCN being configured to build an association relationship between various pieces of semantic information;

obtaining a matching degree between a text feature set corresponding to a to-be-located text and each of the respective enhanced semantic information using an image region locating network model, the image region locating network model being configured to determine a matching relationship between the image candidate region and the to-be-located text, each word in the to-be-located text corresponding to one word feature in the text feature set; and determining a target image candidate region from the one or more regions according to the matching degree between the text feature set and each of the respective enhanced semantic information; and the bus system being configured to connect the memory and the processor to enable the memory and the processor to perform communication.

According to another aspect of the present disclosure, a server is provided, including a memory, a transceiver, a processor, and a bus system;

the memory being configured to store a program;

the processor being configured to execute the program in the memory to perform the following operations:

obtaining a to-be-trained text set and a to-be-trained image candidate region set, the to-be-trained text set including a first to-be-trained text and a second to-be-trained text, the to-be-trained image candidate region set including a first to-be-trained image candidate region and a second to-be-trained image candidate region, the first to-be-trained text and the first to-be-trained image candidate region having a matching relationship, the first to-be-trained text and the second to-be-trained image candidate region having no matching relationship, the second to-be-trained text and the second to-be-trained image candidate region having a matching relationship, the second to-be-trained text and the first to-be-trained image candidate region having no matching relationship;

determining a target loss function according to the first to-be-trained text, the second to-be-trained text, the first to-be-trained image candidate region, and the second to-be-trained image candidate region; and training a to-be-trained image region locating network model by using the target loss function, to obtain an image region locating network model, the image region locating network model being configured to determine a matching relationship between an image candidate region and a to-be-located text according to a text feature set and enhanced semantic information, the enhanced semantic information and the image candidate region having a correspondence, the text feature set and the to-be-located text having a correspondence; and the bus system being configured to connect the memory and the processor to enable the memory and the processor to perform communication.

In some implementations, the processor is configured to execute the program in the memory to perform the following operation:

determining the target loss function in the following manner:

$$L(n_i^+, h_i^+, n_j^-, h_k^-) = \lambda_1 \max(0, u_1 + d(n_i^+, h_i^+) - d(n_i^+, h_k^-)) + \lambda_2 \max(0, u_2 + d(n_i^+, h_i^+) - d(n_j^-, h_i^+))$$

where L represents the target loss function, $n_i^+$ represents the first to-be-trained image candidate region, $h_i^+$ represents the first to-be-trained text, $n_j^-$ represents the second to-be-trained image candidate region, $h_k^-$ represents the second to-be-trained text, d( ) represents a to-be-trained data pair, max( ) represents taking the maximum value, $\lambda_1$ represents a first parameter control weight, $\lambda_2$ represents a second parameter control weight, $u_1$ represents a first preset threshold, and $u_2$ represents a second preset threshold.

According to another aspect of the present disclosure, a method for locating an image region is provided, including:
receiving an image locating instruction;
obtaining an image candidate region set in a to-be-located image according to the image locating instruction in response to the image locating instruction, the image candidate region set including N image candidate regions, N being an integer greater than or equal to 1;
generating a region semantic information set according to the image candidate region set, the region semantic information set including N pieces of region semantic information, each piece of region semantic information corresponding to one image candidate region;
obtaining an enhanced semantic information set corresponding to the region semantic information set by using a GCN, the enhanced semantic information set including N pieces of enhanced semantic information, each piece of enhanced semantic information corresponding to one piece of region semantic information, the GCN being configured to build an association relationship between various pieces of region semantic information;
obtaining a text feature set corresponding to a to-be-located text, the to-be-located text including T words, the text feature set including T word features, each word corresponding to one word feature, T being an integer greater than or equal to 1; obtaining a matching degree between the text feature set and the each piece of enhanced semantic information by using an image region locating network model, the image region locating network model being configured to determine a matching relationship between the image candidate region and the to-be-located text;
determining a target image candidate region from the image candidate region set according to the matching degree between the text feature set and the each piece of enhanced semantic information; and
transmitting an image generation instruction to a client, to enable the client to display the target image candidate region according to the image generation instruction.

According to another aspect of the present disclosure, a computing device comprises one or more processors and memory. The memory stores one or more programs. The one or more programs comprise instructions that, when by the one or more processors, causing the one or more processors to perform any of the methods disclosed herein.

According to another aspect of the present disclosure, a non-transitory computer-readable storage medium is provided, the computer-readable storage medium storing instructions, the instructions, when executed by one or more processors of a computing device, causing the computing device to perform any of the methods disclosed herein.

DESCRIPTION OF EMBODIMENTS

Figure 1:
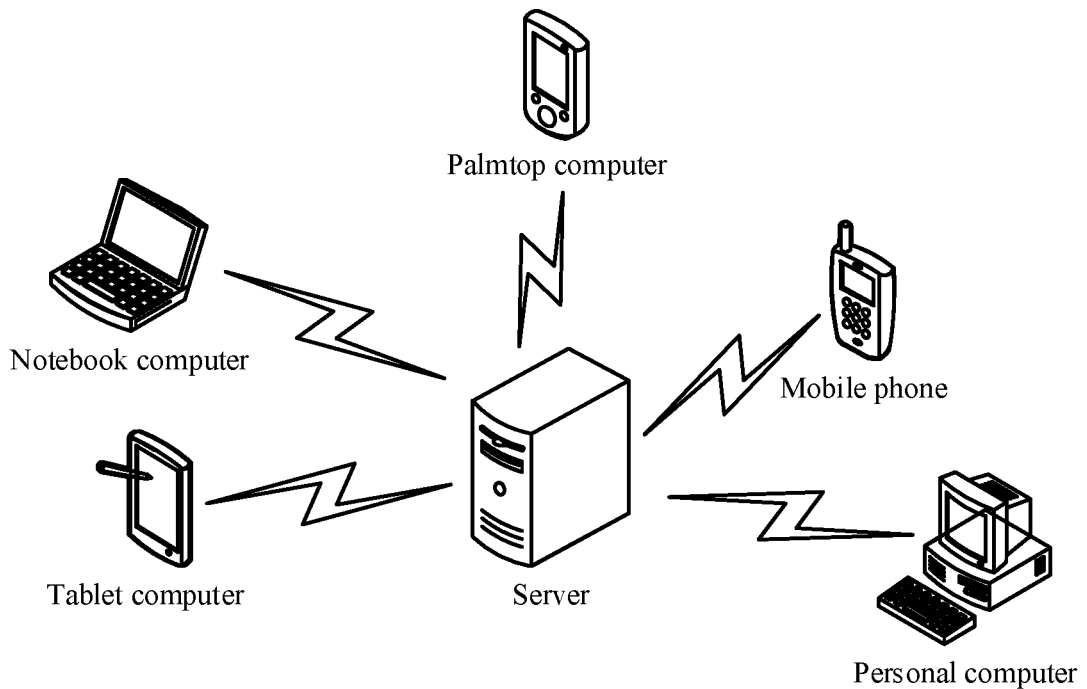
FIG. 1 is a schematic architectural diagram of a system for locating an image region according to an embodiment of the present disclosure.

In related technologies, although an image region that best matches a natural language may be located from an image, a spatial relationship between local regions is not considered, and semantic information between local regions is ignored. As a result, a target image region fails to be accurately located, resulting in a reduced image understanding capability.

Embodiments of the present disclosure provide a method for locating an image region, a model training method, and a related apparatus. A semantic representation between image candidate regions can be effectively enhanced by using a GCN, and a spatial relationship between image candidate regions is considered, which is beneficial to improving the accuracy of locating an image region, thereby improving the image understanding capability.

The terms "first", "second", "third", "fourth", and the like (if any) in the specification and the claims of the present disclosure and the foregoing accompanying drawings are used for distinguishing similar objects, and are not necessarily used for describing a particular sequence or order. It is to be understood that the data used in such a way are interchangeable in proper circumstances so that the embodiments of the present disclosure described herein can be implemented in orders except the order illustrated or described herein. In addition, the terms "include", "corresponding to" and any other variants are intended to cover the non-exclusive inclusion. For example, a process, method, system, product, or device that includes a series of steps or units is not necessarily limited to those expressly listed steps or units, but may include other steps or units not expressly listed or inherent to such a process, method, product, or device.

The method for locating an image region provided in the present disclosure is applicable to the fields such as image processing and mode recognition, to locate a target of interest in an image, so that a specific type of target can be determined and a boundary box of the target is given. The method for locating an image region is widely applied to fields such as facial recognition, medical imaging, intelligence video monitoring, robot navigation, content-based image retrieval, image-based drawing technology, image editing, and augmented reality. For example, in the scenario of content-based image retrieval, it is assumed that there is an image A. A plurality of candidate regions are extracted from the image A. In some embodiments, each of the candidate regions corresponds to a respective candidate object in the image A. As an example, suppose a user inputs a sentence "a boy holds an apple". In this case, the sentence is matched against each candidate region. A target candidate region is selected from a plurality of candidate regions according to a matching result. The present disclosure is mainly to complete natural sentence image locating by using a GCN. The natural sentence may be a word, a phrase or a sentence, and a target candidate region of an image corresponding to a natural sentence is found. The target candidate region may be defined as a rectangular box.

During actual application, the image region locating may include three levels. The first level is an image level. That is, it is determined whether there is a related target object in an image. In image classification or image annotation technologies, for example, for the word "apple", the object "apple" may be circled from the image.

The second layer is a region level. That is, it is determined that a region in an image contains a type of targets. In the detection of a target type in an image, for example, for a sentence "a boy holds an apple", a region may be framed from an image. The region includes a boy and an apple.

The third layer is a region level. That is, which type of target object each pixel in the image belongs is determined. The pixel level segmentation also includes type-level target segmentation and semantic segmentation. A main difference between the type-level target segmentation and the semantic segmentation is that in the semantic segmentation, all targets including the background in the image need to be segmented, the types of the targets need to be determined, whereas in the target segmentation, it is only necessary to segment targets of interest and classify the targets.

For ease of understanding, the present disclosure proposes a method for locating an image region. The method is applicable to a system for locating an image region shown in FIG. 1. FIG. 1 is a schematic architectural diagram of a system for locating an image region according to an embodiment of the present disclosure. As shown in the figure, the method for locating an image region provided in the present disclosure may be applicable to a server or applicable to a client. If the method is applied to a server, after determining a locating result, the server may transmit the locating result to a client, and display a corresponding target image candidate region by using the client. If the method is applied to a client, after determining a locating result, the client may directly display a corresponding target image candidate region. Specifically, for one image, an image detection method is used first to obtain a plurality of image candidate regions (that is, local regions of the image). For the plurality of image candidate regions, a spatial relationship between the image candidate regions is used to build a graph. For the image candidate regions, a CNN may then be used to extract corresponding semantic features. Based on the obtained semantic features and the built graph, a GCN is used to further learn representations of the image candidate regions. Based on the representations of the image candidate regions obtained by using the GCN, a semantic matching manner is used to measure semantic relatedness between these image candidate regions and a given natural sentence, to further determine the most correlated image candidate region as an eventual result of natural sentence image locating, that is, obtain a target image candidate region.

The client is deployed on a terminal device. The terminal device includes, but is not limited to, a tablet computer, a notebook computer, a palmtop computer, a mobile phone, a voice interaction device, and a personal computer (PC), and is not limited herein. The voice interaction device includes, but is not limited to, a smart sound and a smart home appliance.

The method for locating an image region proposed in the present disclosure may provide a service of natural sentence image locating. The service may be deployed on a server side or may be deployed on a terminal device side. It may be understood that the application of the method for locating an image region on a server side can complete deeper understanding of images, to further perform more detailed fine-granularity annotation on the images, thereby helping a user with rapid and precise search and matching and also the application to personalized recommendation of picture and text information. The method for locating an image region may be deployed on a terminal device, for example, a mobile phone terminal or a robot. A camera of the robot obtains a corresponding image signal, and a user uses a natural language to interact with the corresponding robot. For example, the user obtains a corresponding natural language text through an input with voice or a keyboard, and then uses an image region locating network model to locate a local region of an image for a corresponding natural language text. In this manner, the terminal device may be enabled to better interact with the user.

In an exemplary scenario, a user may conveniently perform precise search. The user uses voice or a keyboard to input a natural language text on a terminal device. The terminal device uses the method for locating an image region in the embodiments of the present disclosure to determine a region having the highest matching degree with a natural language text from a to-be-located image, to implement precise search of an image. This is of practical significance for the field of criminal investigation and the field of education. For example, in the field of criminal investigation, a suspect with a feature can be precisely located from a surveillance video image. Alternatively, in the field of education, any student can be precisely located from a class video image. Complex manual screening is not required, and a user only needs to input a natural language text.

In an exemplary scenario, a service terminal may conveniently perform personalized recommendation for a terminal device corresponding to a user. The service terminal collects a natural language text that is inputted by the user and is fully authorized, and the service terminal uses the method for locating an image region in the embodiments of the present disclosure to determine a region having the highest matching degree with a natural language text from a to-be-located image, to push similar image resources, video resources, webpage resources, and the like to chosen regions, so that more accurate personalized recommendation can be achieved, thereby improving the degree of precision of a resource recommendation process.

Figure 2:
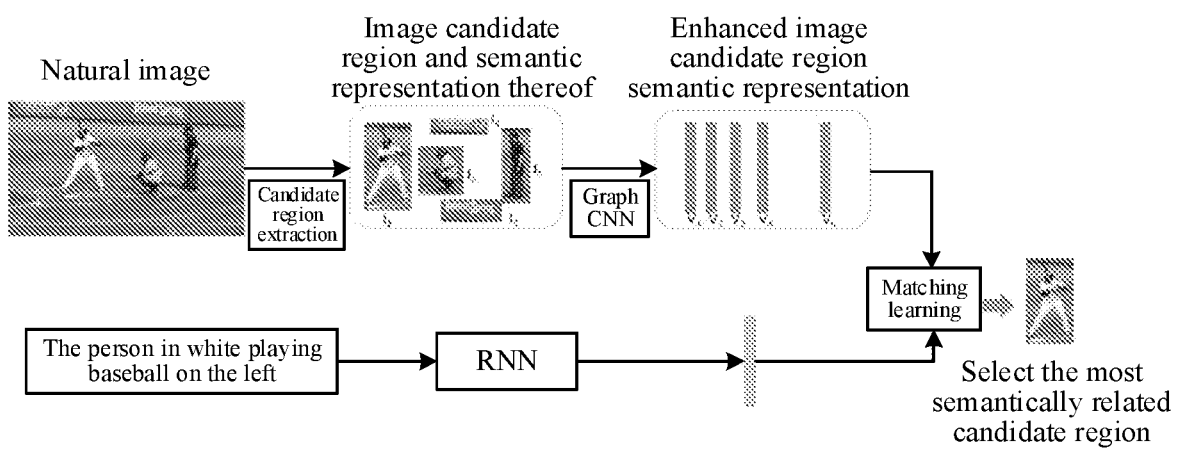
FIG. 2 is a schematic diagram of an overall framework for locating an image region according to an embodiment of the present disclosure.

For ease of understanding, referring to FIG. 2, FIG. 2 is a schematic diagram of an overall framework for locating an image region according to an embodiment of the present disclosure. As shown in the figure, for a natural image, an object proposal method is used to obtain corresponding image candidate regions. In some embodiments, a corresponding image candidate region corresponds to a respective candidate object in the image. After the corresponding image candidate regions are extracted, a corresponding CNN is used to extract semantic representations of the corresponding image candidate regions, and each candidate region is represented as one feature vector. A semantic representation $\{I_1, I_2, I_3, I_4 \ldots, I_n\}$ corresponding to a corresponding candidate region is further obtained, where n represents a total quantity of image candidate regions extracted from the image. Subsequently, a GCN is used to enhance the extracted semantic representation of the image candidate region, to obtain an enhanced semantic representation $\{V_1, V_2, V_3, V_4 \ldots, V_n\}$ of the image candidate region. In a process of building the GCN, the semantic similarity between image candidate regions is taken into consideration, to build a corresponding graph, and further define corresponding connecting edge information. The connecting edge information is used to enhance the semantic representation of the corresponding image candidate region.

For an inputted natural sentence (for example, "the person in white playing baseball on the left"), an RNN is used to encode the natural sentence to obtain a semantic representation corresponding to the natural sentence. For the semantic representation of the natural sentence and the corresponding enhanced semantic representation of the image candidate region, a matching learning method is used to learn a semantic relationship between a natural sentence and a corresponding image candidate region. Finally, the semantic similarity between the natural sentence and the image candidate region is used to select the most semantically related image candidate region as a target image candidate region.

Figure 3:
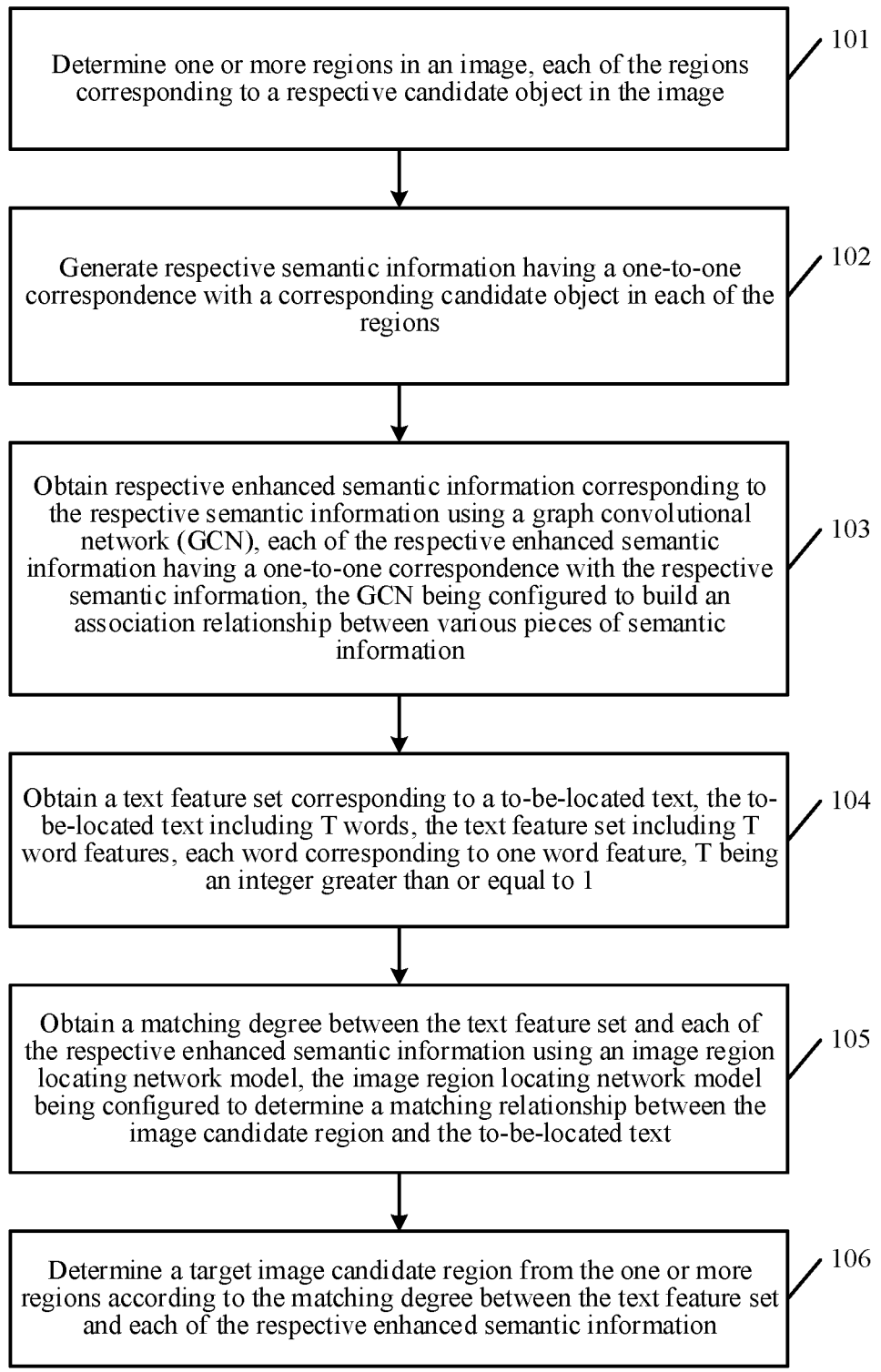
FIG. 3 is a schematic diagram of an embodiment of a method for locating an image region according to an embodiment of the present disclosure.

With reference to the foregoing description, the method for locating an image region in the present disclosure is described below. Referring to FIG. 3, an example in which the method is applied to an apparatus for locating an image region is used for description. The apparatus for locating an image region may be deployed on a server or may be deployed on a terminal device. An embodiment of the method for locating an image region in the embodiments of the present disclosure includes the following steps:

101. The apparatus for locating an image region determines one or more regions in an image. Each of the regions corresponds to a respective candidate object in the image.

In this embodiment, the apparatus for locating an image region first obtains an image. image may be an image stored on a backend server or may be an image uploaded by a client or may be a local image on a client. It may be understood that the apparatus for locating an image region may be deployed on a server or may be deployed on a terminal device. This is not limited herein.

After the apparatus obtains the image, an object proposal method may be used to extract an image candidate region set in a to-be-located image. The image candidate region set includes N image candidate regions, and N is an integer greater than 1 or equal to 1. When N is equal to 1, it represents that there is only one image candidate region in the to-be-located image, and the image candidate region is directly used as a target image candidate region.

Based on the object proposal method, an image candidate region in an image can be extracted. Specifically, the image candidate region, a position where a target may appear in an image is found in advance. That is to say, in some embodiments, each of the regions corresponds to a respective candidate object. With information such as texture, edges, and colors in an image, it is ensured that a relatively high recall rate (Intersection-over-Union, IoU) can be kept while a relatively small number of windows are selected. The object proposal method includes, but is not limited to, a region-based CNN (R-CNN), a fast R-CNN, and a faster R-CNN, and the like. This is not limited herein.

102. The apparatus for locating an image region generates respective semantic information (e.g., a region semantic information) having a one-to-one correspondence with a corresponding candidate object in each of the regions.

In this embodiment, after obtaining the image candidate region set, the apparatus for locating an image region generates a corresponding semantic representation of an image candidate region by using a neural network, to obtain a region semantic information set. The region semantic information set includes N pieces of region semantic information. Each piece of region semantic information corresponds to one image candidate region.

The neural network may be specifically a CNN. During actual application, the neural network may be another type of neural network. This is only a schematic here, and is not to be understood as a limitation to the present disclosure.

In the foregoing process, that is, the apparatus for locating an image region generates a region semantic information set according to an image candidate region set in a to-be-located image, each piece of region semantic information in the region semantic information set corresponding to one image candidate region in the image candidate region set.

103. The apparatus for locating an image region obtains respective enhanced semantic information corresponding to the respective semantic information using a GCN. Each of the respective enhanced semantic information set has a one-to-one correspondence with the respective semantic information, the GCN being configured to build an association relationship between various pieces of semantic information.

In some embodiments, the image comprises a plurality of regions. The apparatus generates a set of semantic information (e.g., a semantic information set, or a region semantic information set) according to a plurality of respective semantic information. In some embodiments, the apparatus obtains a set of enhanced semantic information (e.g., an enhanced semantic information set) corresponding to the set of semantic information using the GCN.

That is, each piece of enhanced semantic information in the enhanced semantic information set corresponds to one piece of region semantic information in the region semantic information set.

In this embodiment, the apparatus for locating an image region obtains the enhanced semantic information set corresponding to the region semantic information set by using a GCN. That is, the semantic representation of the image candidate region may be enhanced by using the GCN. The enhanced semantic information set includes N pieces of enhanced semantic information. That is, each image candidate region corresponds to one piece of region semantic information, and each image candidate region corresponds to one piece of region semantic enhanced semantic information. The GCN may be used to build an association relationship between nodes. In the present disclosure, an association relationship may be built between various pieces of region semantic information.

The GCN is a convolutional network model. Corresponding to the GCN, an object of the GCN is to learn a mapping of a signal or a feature in a graph G=(V, E). A process of building the graph is performed after an image candidate region is obtained. The graph is built according to the spatial information between image candidate regions. Information included in data and relationships between data can be used to enhance the semantic expression of the image candidate region, so that enhanced semantic information is obtained.

104. The apparatus for locating an image region obtains a text feature set corresponding to a to-be-located text, the to-be-located text including T words, the text feature set including T word features, each word corresponding to one word feature, T being an integer greater than or equal to 1.

In this embodiment, the apparatus for locating an image region obtains the to-be-located text. It may be understood that, step 104 may be performed before step 101, or may be performed after step 103, or may be performed simultaneously with step 101. The execution order of step 104 is not limited herein. The to-be-located text may be specifically a text inputted by a user or may be a text obtained by recognizing voice inputted by the user. The to-be-located text is represented in the form of a word, a phrase, a sentence, a paragraph, or the like. The to-be-located text may be in Chinese, English, Japanese, French, German, Russian, or the like. This is not limited herein.

After the to-be-located text is obtained, feature extraction and encoding are performed on each word in the to-be-located text, to eventually obtain a text feature set. For example, the to-be-located text "boy holds an apple" includes four words, namely, "boy", "holds", "an", and "apple". Features of the four words are extracted and then encoded, to further obtain a text feature set. The to-be-located text includes T words. The text feature set includes T word features. Each word corresponds to one word feature. T is an integer greater than or equal to 1.

It may be understood that the to-be-located text "boy holds an apple" is a concrete expression. Therefore, an image candidate region that includes both "boy" and "apple" may be obtained from the to-be-located image.

105. The apparatus for locating an image region obtains a matching degree between the text feature set and each of the respective enhanced semantic information using an image region locating network model, the image region locating network model being configured to determine a matching relationship between the image candidate region and the to-be-located text.

In this embodiment, the apparatus for locating an image region may separately input each piece of enhanced semantic information and the text feature set into the image region locating network model, and the image region locating network model outputs a corresponding matching degree. The image region locating network model is configured to determine a matching relationship between an image candidate region and a to-be-located text. That is, when the matching degree is higher, it represents that the matching relationship is stronger.

It may be understood that, the matching degree may be expressed as a matching score or a matching identifier, or may be represented as another type of matching relationship.

In the foregoing process, that is, the apparatus for locating an image region obtains a matching degree between a text feature set corresponding to a to-be-located text and the each piece of enhanced semantic information by using an image region locating network model. Each word in the to-be-located text corresponds to one word feature in the text feature set.

106. The apparatus for locating an image region determines a target image candidate region from the one or more regions according to the matching degree between the text feature set and each of the respective enhanced semantic information.

In this embodiment, the apparatus for locating an image region may select an image candidate region with the highest matching degree from the image candidate region set as a target image candidate region according to the matching degree between the text feature set and the each piece of enhanced semantic information. For ease of description, Table 1 is a schematic of a matching degree between a text feature set and enhanced semantic information.

TABLE 1

| Image candidate region | Text feature set and enhanced semantic information | Matching degree |
|---|---|---|
| Image candidate region A | Text feature set + enhanced semantic information A | 77 |
| Image candidate region B | Text feature set + enhanced semantic information B | 58 |
| Image candidate region C | Text feature set + enhanced semantic information C | 30 |

TABLE 1-continued

| Image candidate region | Text feature set and enhanced semantic information | Matching degree |
|---|---|---|
| Image candidate region D | Text feature set + enhanced semantic information D | 80 |
| Image candidate region E | Text feature set + enhanced semantic information E | 60 |

As can be learned from Table 1, a matching degree corresponding to "text feature set+enhanced semantic information D" is the maximum. Therefore, the apparatus for locating an image region uses the image candidate region D as a target image candidate region.

In the embodiments of the present disclosure, a method for locating an image region is provided. The method includes: first obtaining an image candidate region set in a to-be-located image, the image candidate region set including N image candidate regions, then generating a region semantic information set according to the image candidate region set, each piece of region semantic information corresponding to one image candidate region, then obtaining the enhanced semantic information set corresponding to the region semantic information set by using a GCN, each piece of enhanced semantic information corresponding to one piece of region semantic information, the GCN being configured to build an association relationship between various pieces of region semantic information, in addition, obtaining a text feature set corresponding to a to-be-located text, next, obtaining the matching degree between the text feature set and the each piece of enhanced semantic information by using an image region locating network model, and finally, determining a target image candidate region from the image candidate region set according to the matching degree between the text feature set and the each piece of enhanced semantic information. In the foregoing manner, a semantic representation between image candidate regions can be effectively enhanced by using a GCN, and a spatial relationship between image candidate regions is considered, which is beneficial to improving the accuracy of locating an image region, thereby improving the image understanding capability.

Based on the foregoing embodiment corresponding to FIG. 3, in some embodiments, the generating, by the apparatus for locating an image region, a region semantic information set according to the image candidate region set may include:

obtaining, by the apparatus for locating an image region, the region semantic information corresponding to each image candidate region by using a CNN, the image candidate region including region information, the region information including position information of the image candidate region in the to-be-located image and size information of the image candidate region; and generating, by the apparatus for locating an image region, the region semantic information set according to the N pieces of region semantic information when region semantic information corresponding to N image candidate regions is obtained.

In this embodiment, after obtaining the image candidate region set, the apparatus for locating an image region may generate region semantic information of each image candidate region by using a CNN, the region semantic information being the semantic representation of the image candidate region. Specifically, it is assumed that the image candidate region set is defined as $\{b_1, b_2, b_3, b_4 \ldots, b_n\}$. Each image candidate region includes region information $b_i=\{x_1, y_1, w_1, h_1\}$. The image candidate region $b_i$ represents one image candidate region in the image candidate region set. $x_1$ and $y_1$ represent the position information of the image candidate region in the to-be-located image. Specifically, $x_1$ represents horizontal coordinate position information of the highest point of the image candidate region in the to-be-located image, $y_1$ represents the vertical coordinate position information of the highest point of the image candidate region in the to-be-located image, $w_1$ and $h_1$ represent size information of the image candidate region, the size information is a proportional size of the image candidate region relative to the to-be-located image, $w_1$ represents width information of the image candidate region in the to-be-located image, and $h_1$ represents height information of the image candidate region in the to-be-located image.

The image candidate region $b_i$ is inputted into the CNN, to obtain the following representation:

$$I_i = CNN(b_i).$$

In this way, corresponding region semantic information $I_i$ is obtained. In the foregoing manner, the region semantic information set $\{I_1, I_2, I_3, I_4, \ldots, I_n\}$ corresponding to the image candidate region set $\{b_1, b_2, b_3, b_4, \ldots, b_n\}$ is obtained, where n is an integer greater than or equal to 1 and is less than or equal to N.

For ease of understanding, the CNN usually includes several layers, namely, a convolutional layer, a rectified linear unit (ReLU) layer, a pooling layer, and a fully-connected layer.

For the convolutional layer, each convolutional layer in a CNN is formed by a plurality of convolutional units. Parameters of each convolutional unit are obtained through optimization by using a reverse propagation algorithm. The objective of convolutional operation is to extract inputted different features. The first convolutional layer can only extract some low-level features, for example, levels such as edges, lines, angles, and the like, and a network with more layers can iteratively extract more complex features from the low-level features.

For the ReLU layer, the linear rectification (ReLU) is used for the activation function in the layer of neural network.

For the pooling layer, features in very large dimensions are usually obtained after a convolutional layer, features are divided into a plurality of regions, and a maximum value or an average value thereof are taken, to obtain new features in relatively small dimensions.

For the fully-connected layer, all local features are combined to form global features, and are used to calculate the eventual score of each type.

Next, in the embodiments of the present disclosure, a manner of generating a region semantic information set is provided. Region semantic information corresponding to an image candidate region is first obtained by using a CNN. The image candidate region includes region information. The region information includes the position information of the image candidate region in the to-be-located image and the size information of the image candidate region. A region semantic information set is generated according to N pieces of region semantic information when region semantic information corresponding to N image candidate regions is obtained. In the foregoing manner, region semantic information of each image candidate region can be extracted by using a CNN. The CNN is a feed-forward neural network. Artificial neurons in the CNN may respond to surrounding units in a partial coverage area, and therefore there is excellent performance for large-scale image processing. In this way, the accuracy of information extraction is improved.

Based on the foregoing embodiment corresponding to FIG. 3, in some embodiments, the obtaining, by the apparatus for locating an image region, the enhanced semantic information set corresponding to the region semantic information set by using a GCN may include:

obtaining, by the apparatus for locating an image region, first region semantic information and second region semantic information from the region semantic information set, the first region semantic information being any one piece of region semantic information in the region semantic information set, the second region semantic information being any one piece of region semantic information in the region semantic information set;

obtaining, by the apparatus for locating an image region, strength of a connecting edge between the first region semantic information and the second region semantic information;

normalizing, by the apparatus for locating an image region, the strength of the connecting edge between the first region semantic information and the second region semantic information, to obtain normalized strength;

determining, by the apparatus for locating an image region, a target connection matrix according to normalized strength between the various pieces of region semantic information in the region semantic information set; and determining, by the apparatus for locating an image region, the enhanced semantic information set corresponding to the target connection matrix by using the GCN.

In this embodiment, the apparatus for locating an image region uses one GCN to complete the enhancement of the semantic representation of the image candidate region. First, one graph needs to be built. Each node in this graph corresponds to the region semantic information of the image candidate region. There is a corresponding connecting edge between all nodes. The strength of connection information of the connecting edge comes from one deep network for prediction:

$$e_{ij} = f_{edge}(n_i^k \| n_j^k),$$

where $n_i^k$ represents the first region semantic information, $n_j^k$ represents the second region semantic information, and $f_{edge}(\ )$ represents the deep network, and may be specifically implemented by using a multi-layer perceptron, a vector inner product or cosine similarity. $e_{ij}$ represents the strength of the connecting edge between the first region semantic information and the second region semantic information. Next, $e_{ij}$ is normalized, to obtain normalized strength. A target connection matrix is then determined according to the normalized strength between various pieces of region semantic information in the region semantic information set. Finally, an enhanced semantic information set corresponding to the target connection matrix is generated by using a GCN.

The graph is a data format. The graph may be used to represent a social network, a communication network, a protein molecule network, or the like. A node in the graph represents an individual in the network. A connecting edge represents a connection relationship between individuals. Many machine learning tasks need to use graph structure data. Therefore, the appearance of a GCN provides a new concept for resolving these problems. A convolution slice may be built by using three steps: step 1, selecting a node sequence of a fixed length from a graph; step 2, collecting a neighbor domain set of a fixed size for each node in the sequence; and step 3, standardizing a subgraph formed by a current node and a neighbor domain corresponding to the node for use as an input of a convolutional structure. After all convolution slices are built by using the foregoing three steps, a convolutional structure is used to separately perform an operation on each slice.

Next, in the embodiments of the present disclosure, a manner of obtaining an enhanced semantic information set by using a GCN is provided. First, first region semantic information and second region semantic information are obtained from a region semantic information set. Strength of a connecting edge between the first region semantic information and the second region semantic information is then obtained. Next, the strength of the connecting edge between the first region semantic information and the second region semantic information is normalized, to obtain normalized strength. A target connection matrix is then determined according to the normalized strength between various pieces of region semantic information in the region semantic information set. Finally, an enhanced semantic information set corresponding to the target connection matrix is determined by using a GCN. In the foregoing manner, a semantic relationship between image candidate regions is built by using a GCN. In this way, spatial information and a semantic relationship are fully considered, thereby improving image-based locating performance.

Based on the foregoing second embodiment corresponding to FIG. 3, in some embodiments of the present disclosure, the determining, by the apparatus for locating an image region, a target connection matrix according to the normalized strength between various pieces of region semantic information in the region semantic information set may include:

generating, by the apparatus for locating an image region, a connection matrix according to the normalized strength between the various pieces of region semantic information in the region semantic information set; and generating, by the apparatus for locating an image region, the target connection matrix according to the connection matrix and an identity matrix.

In this embodiment, the apparatus for locating an image region may first normalize the strength of the connecting edge between the first region semantic information and the second region semantic information, to obtain normalized strength. Based on the foregoing embodiment, the strength of the connecting edge between the first region semantic information and the second region semantic information is specifically represented as:

$$e_{ij}=w_2(w_1(n_i^k\|n_j^k)+b_1)+b_2,$$

where $n_i^k$ represents the first region semantic information, $n_j^k$ represents the second region semantic information, $b_1$, $b_2$, $w_1$, and $w_2$ are all model parameters of the GCN, and $e_{ij}$ represents the strength of the connecting edge between the first region semantic information and the second region semantic information.

A normalization operation may further be performed on corresponding edge information, to obtain normalized strength:

$$\hat{e}_{ij} = \frac{e_{ij}}{\sum_j e_{ij}},$$

where $\hat{e}_{ij}$ represents the normalized strength between the first region semantic information and the second region semantic information. All pieces of region semantic information are traversed, so that connection information of corresponding region semantic information may be obtained, to further build a complete connection matrix:

$$E = \begin{bmatrix} \hat{e}_{11} & \cdots & \hat{e}_{1n} \\ \cdots & \cdots & \cdots \\ \hat{e}_{n1} & \cdots & \hat{e}_{nn} \end{bmatrix}.$$

To further enhance the information, an identity matrix is further added to the corresponding complete connection matrix, to obtain a target connection matrix:

$$E = \begin{bmatrix} \hat{e}_{11}+1 & \cdots & \hat{e}_{1n} \\ \cdots & \cdots & \cdots \\ \hat{e}_{n1} & \cdots & \hat{e}_{nn}+1 \end{bmatrix}.$$

Next, in the embodiments of the present disclosure, a manner of determining a target connection matrix according to the normalized strength between various pieces of region semantic information in the region semantic information set is provided. That is, a connection matrix is first generated according to the normalized strength between various pieces of region semantic information in the region semantic information set. A target connection matrix is then generated according to the connection matrix and the identity matrix. In the foregoing manner, with a processing measure of normalization, the absolute values of values in a physical system may be turned into a relative value relationship, thereby simplifying calculation and reducing the magnitude. In addition, to further enhance the information, an identity matrix is further added to the corresponding connection matrix, to form a target connection matrix.

Based on the foregoing second or third embodiment corresponding to FIG. 3, in some embodiments of the present disclosure, the determining, by the apparatus for locating an image region, an enhanced semantic information set corresponding to the target connection matrix by using a GCN may include:

calculating, by the apparatus for locating an image region, the enhanced semantic information set in the following manner:

$$n_i^k = \sum_{j \in neighboring(i)} (w_j^k(n_j^{k-1}) + b_j^k)E_{ij},$$

where $n_i^k$ represents an $i^{th}$ piece of enhanced semantic information corresponding to a $k^{th}$ layer of GCN, $n_j^{k-1}$ represents a $j^{th}$ piece of enhanced semantic information corresponding to a $(k-1)^{th}$ layer of GCN, $w_j^k$ represents a first network parameter of the $k^{th}$ layer of GCN, $b_j^k$ represents a second network parameter of the $k^{th}$ layer of GCN, $j \in$ neighboring(i) represents that a $j^{th}$ node is a neighboring node of an $i^{th}$ node, and $E_{ij}$ represents an element in the target connection matrix.

In this embodiment, the enhancing, by the apparatus for locating an image region, the semantic representation of the image candidate region by using a GCN based on target connection matrix may use the following formula:

$$n_i^k = \sum_{j \in neighboring(i)} \left( w_j^k (n_j^{k-1}) + b_j^k \right) E_{ij},$$

where $w_j^k$ represents a first network parameter of the $k^{th}$ layer of GCN, and $b_j^k$ represents a second network parameter of the $k^{th}$ layer of GCN. It may be understood that, the network parameters of the GCN are not shared between convolutional layers of the graph. However, in a fixed convolutional layer, the network parameters of the GCN may be shared or may be not shared. A neighboring node corresponding to a node i is selected as a node J. The similarity between nodes may be measured by using the semantic similarity between the nodes. Therefore, one fully-connected graph structure is built, and correspondingly each node is connected to another node. Finally, a corresponding semantic representation of each node is updated based on the built target connection matrix.

Multi-layer graph convolutional processing may be performed in the GCN, and may be performed a plurality of times for the foregoing formula. For the parameters in the formula, the same set of network parameters may be shared or network parameters may be not shared.

Further, in the embodiments of the present disclosure, a specific manner of an enhanced semantic information set corresponding to the target connection matrix is determined by using a GCN is provided. In the foregoing manner, a specific calculation manner is provided for GCN-based calculation, thereby improving the feasibility and operability of the solution.

Based on the foregoing embodiment corresponding to FIG. 3, in some embodiments of the present disclosure, the obtaining, by the apparatus for locating an image region, a text feature set corresponding to a to-be-located text may include:

obtaining, by the apparatus for locating an image region, a to-be-located text;
  obtaining, by the apparatus for locating an image region, a text vector sequence according to the to-be-located text, the text vector sequence including T word vectors, each word vector corresponding to one word;
  encoding, by the apparatus for locating an image region, each word vector in the text vector sequence, to obtain a text feature; and
  generating, by the apparatus for locating an image region, the text feature set according to the T text features when text features corresponding to the T word vectors are obtained.

In this embodiment, the apparatus for locating an image region first obtains a to-be-located text. The to-be-located text may be a text inputted by a user, may be a text converted from a voice inputted by the user, or may be a text extracted from a backend. After the to-be-located text is obtained, each word in the to-be-located text is extracted, and a word vector is then built for each word. It is assumed that the to-be-located text includes T words. In this case, T word vectors may be obtained. The T word vectors form a text vector sequence. The apparatus for locating an image region encodes the text vector sequence by using an LSTM network structure. Specifically, each word vector is encoded by using the LSTM structure, to obtain T text features, thereby generating a text feature set.

In a natural language processing task, how to represent words in a computer is first considered. Generally, there are two representation manners, namely, discrete representation (one-hot representation) and distributed representation. In the one-hot representation, each word is represented as one long vector. The dimensions of this vector are a word table size. In the vector, the value of only one dimension is 1, and the remaining dimensions are 0. This dimension represents a current word. The word vector dimensions in the present disclosure may be 300 dimensions. In word embedding, words are converted into distributed representation, or referred to as word vectors. There are many methods for generating word vectors. These methods all follow one idea that the meaning of any word may be represented by words around the word. A manner of generating a word vector may include: a statistics-based method and a language model-based method.

Next, in the embodiments of the present disclosure, a method for obtaining a text feature set is provided. That is, a to-be-located text is first obtained. A text vector sequence is then obtained according to the to-be-located text. The text vector sequence includes T word vectors. Each word vector corresponds to one word. Next, each word vector in the text vector sequence is encoded, to obtain a text feature. A text feature set is generated according to the T text features when text features corresponding to the T word vectors are obtained. In the foregoing manner, the to-be-located text may be represented in a feature form, to further facilitate subsequent model prediction, thereby improving the feasibility and operability of the solution.

Based on the foregoing fifth embodiment corresponding to FIG. 3, in some embodiments of the present disclosure, the encoding, by the apparatus for locating an image region, each word vector in the text vector sequence, to obtain a text feature may include:

obtaining, by the apparatus for locating an image region, the text feature in the following manner:

$$h_t = \text{LSTM}(w_t, h_{t-1}),$$

where $h_t$ represents a $t^{th}$ text feature in the text feature set, LSTM( ) represents performing encoding by using an LSTM network, $w_t$ represents a $t^{th}$ word vector in the text vector sequence, and $h_{t-1}$ represents a $(t-1)^{th}$ text feature in the text feature set.

In this embodiment, the apparatus for locating an image region may encode each word vector by using an LSTM structure, to obtain a text feature. For an inputted to-be-located text $E=\{e_1, e_2, \ldots, e_T\}$, T represents T words in the to-be-located text, and $e_t$ represents a $t^{th}$ word in the to-be-located text. First, a word vector representation of a to-be-located text may be obtained by using a word vector representation of each word, that is, a text vector sequence $\{w_1, w_2, \ldots, w_T\}$ is obtained. Each word vector may have 300 dimensions. For a to-be-located text, an RNN with an LSTM structure is used to encode the to-be-located text, that is:

$$h_t = \text{LSTM}(w_t, h_{t-1}).$$

A quantity of dimensions of hidden states in LSTM may be set to 512. A feature representation of the to-be-located text is obtained after processing, that is, a text feature set $h=\{h_1, h_2, \ldots, h_T\}$ is obtained, where a specific manner of LSTM processing is as follows:

$$\begin{pmatrix} i_t \\ f_t \\ o_t \\ g_t \end{pmatrix} = \begin{pmatrix} \sigma \\ \sigma \\ \sigma \\ \tanh \end{pmatrix} T \begin{pmatrix} w_t \\ h_{t-1} \end{pmatrix},$$

-continued $$c_t = f_t \odot c_{t-1} + i_t \odot g_t, \text{ and}$$

$$h_t = o_t \odot \tanh(c_t),$$

where $w_t$ represents a $t^{th}$ word vector in the text vector sequence, $h_{t-1}$ represents a $(t-1)^{th}$ text feature in the text feature set, $i_t$ represents an input gate, $f_t$ represents a forget gate, $o_t$ represents an output gate, $h_t$ represents a hidden state, $\sigma$ is a sigmoid function, tan h( ) represents a hyperbolic function, $g_t$ represents memory information, $c_t$ represents an LSTM parameter, $\odot$ represents dot multiplication, and T represents a transformation or mapping matrix.

LSTM is long-term storage inputs. A special unit called a memory cell is similar to an adder and a gate-control neuron, and has a weight value in a next time step and is linked to itself to copy an actual value of its own state and an accumulated external signal. However, this self-link is controlled by a multiplication gate, for performing learning and determining when to clear memory content, of another unit.

Next, in the embodiments of the present disclosure, a manner of obtaining a text feature is provided. That is, an RNN with an LSTM structure is used to encode a word vector. In the foregoing manner, with a network with an LSTM structure, a vanishing gradient problem caused by gradual reduction in a backpropagation process can be resolved. Specifically, in a language processing task, the LSTM is suitable for processing problems related to temporal heights, for example, machine translation, dialog generation, and encoding and decoding.

Figure 4:
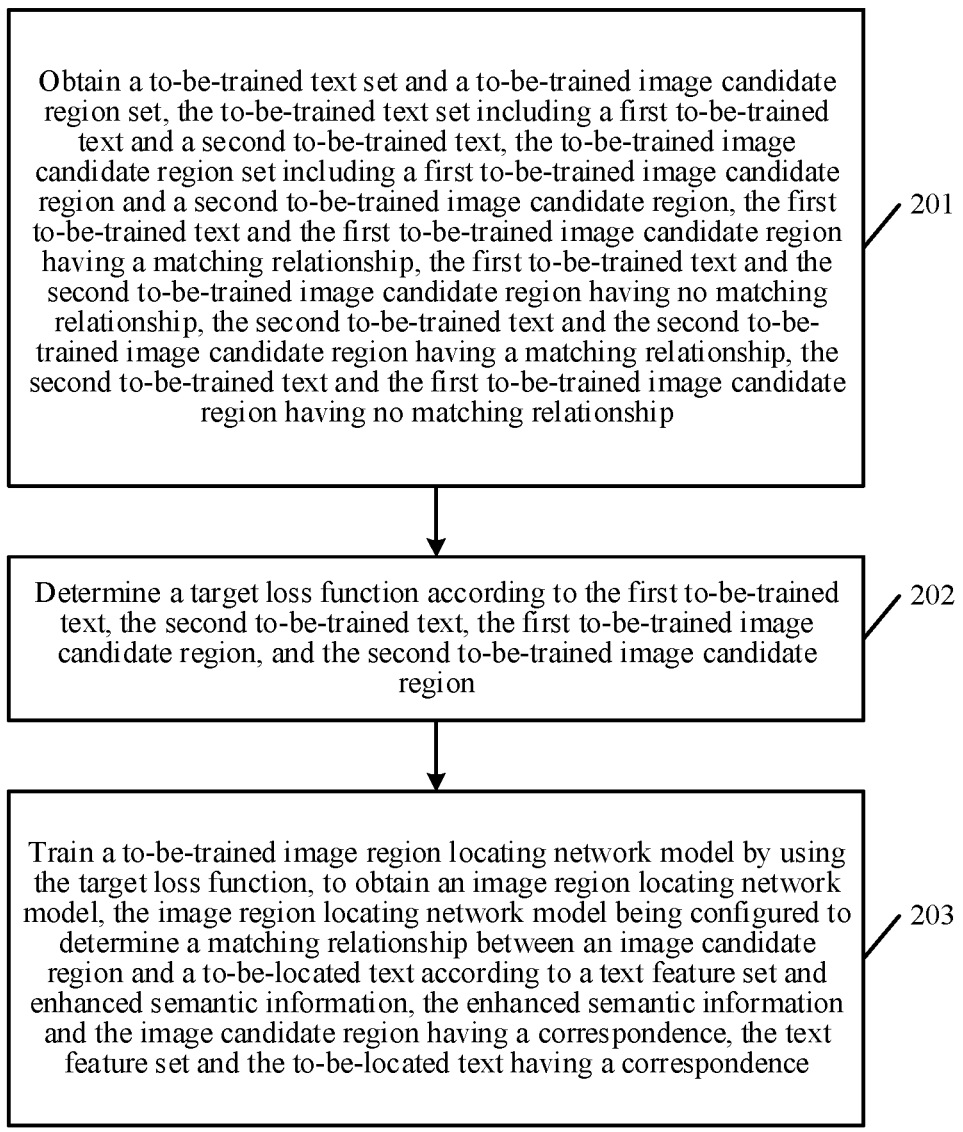
FIG. 4 is a schematic diagram of an embodiment of a model training method according to an embodiment of the present disclosure.

With reference to the foregoing description, a model training method in the present disclosure is described below. Referring to FIG. 4, an example in which the method is applied to a model training apparatus is used as an example for description. The model training apparatus may be deployed on a server. An embodiment of the model training method in the embodiments of the present disclosure includes the following steps:

201. The model training apparatus obtains a to-be-trained text set and a to-be-trained image candidate region set, the to-be-trained text set including a first to-be-trained text and a second to-be-trained text, the to-be-trained image candidate region set including a first to-be-trained image candidate region and a second to-be-trained image candidate region, the first to-be-trained text and the first to-be-trained image candidate region having a matching relationship, the first to-be-trained text and the second to-be-trained image candidate region having no matching relationship, the second to-be-trained text and the second to-be-trained image candidate region having a matching relationship, the second to-be-trained text and the first to-be-trained image candidate region having no matching relationship.

In this embodiment, the model training apparatus first obtains a to-be-trained text set and a to-be-trained image candidate region set. The to-be-trained text set includes a first to-be-trained text and a second to-be-trained text. The to-be-trained image candidate region set includes a first to-be-trained image candidate region and a second to-be-trained image candidate region. In this case, the first to-be-trained text and the first to-be-trained image candidate region having a matching relationship are used as positive samples, and the second to-be-trained text and the second to-be-trained image candidate region having a matching relationship are used as positive samples. The first to-be-trained text and the second to-be-trained image candidate region having no matching relationship are used as negative samples, and the second to-be-trained text and the first to-be-trained image candidate region having no matching relationship are used as negative samples.

It may be understood that the model training apparatus is deployed on a server.

202. The model training apparatus determines a target loss function according to the first to-be-trained text, the second to-be-trained text, the first to-be-trained image candidate region, and the second to-be-trained image candidate region.

In this embodiment, the model training apparatus learns the matching relationship between a natural sentence and an image candidate region according to the positive samples and negative samples, to build a target loss function. The target loss function is mainly configured to measure the similarity between a candidate image region and a natural sentence.

203. The model training apparatus trains a to-be-trained image region locating network model by using the target loss function, to obtain an image region locating network model, the image region locating network model being configured to determine a matching relationship between an image candidate region and a to-be-located text according to a text feature set and enhanced semantic information, the enhanced semantic information and the image candidate region having a correspondence, the text feature set and the to-be-located text having a correspondence.

In this embodiment, the model training apparatus uses the built target loss function to train a locating network model of a to-be-trained image region, to further obtain an image region locating network model. The matching degree between an image candidate region and a to-be-located text may be predicted by using the image region locating network model. When the matching degree is higher, the degree of representation association is higher.

In the embodiments of the present disclosure, a model training method is provided. The method includes: first obtaining a to-be-trained text set and a to-be-trained image candidate region set, the to-be-trained text set including a first to-be-trained text and a second to-be-trained text, the to-be-trained image candidate region set including a first to-be-trained image candidate region and a second to-be-trained image candidate region, then determining a target loss function according to the first to-be-trained text, the second to-be-trained text, the first to-be-trained image candidate region, and the second to-be-trained image candidate region, and finally, training a to-be-trained image region locating network model by using the target loss function, to obtain an image region locating network mode. In the foregoing manner, the image region locating network model configured to determine a matching relationship between an image candidate region and a text can be obtained through training, and the used target function can be used to measure the similarity between an image candidate region and a text, to obtain the matching relationship between a text and an image candidate region through learning, thereby improving the feasibility and operability of the solution.

Based on the foregoing embodiment corresponding to FIG. 4, in some embodiments of the present disclosure, the determining, by the model training apparatus, a target loss function according to the first to-be-trained text, the second to-be-trained text, the first to-be-trained image candidate region, and the second to-be-trained image candidate region may include:

determining, by the model training apparatus, the target loss function in the following manner:

$$L(n_i^+,h_i^+,n_j^-,h_k^-)=\lambda_1 \max(0,u_1+d(n_i^+,h_i^+)-d(n_i^+,h_k^-))+\lambda_2 \max(0,u_2+d(n_i^+,h_i^+)-d(n_j^-,h_i^+))$$

where L represents the target loss function, $n_i^+$ represents the first to-be-trained image candidate region, $h_i^+$ represents the first to-be-trained text, $n_j^-$ represents the second to-be-trained image candidate region, $h_k^-$ represents the second to-be-trained text, d( ) represents a to-be-trained data pair, max( ) represents taking the maximum value, $\lambda_1$ represents a first parameter control weight, $\lambda_2$ represents a second parameter control weight, $u_1$ represents a first preset threshold, and $u_2$ represents a second preset threshold.

In this embodiment, the target loss function built by using the model training apparatus is described, and the target loss function built based on positive samples and negative samples is represented as:

$$L(n_i^+,h_i^+,n_j^-,h_k^-)=\lambda_1 \max(0,u_1+d(n_i^+,h_i^+)-d(n_i^+,h_k^-))+\lambda_2 \max(0,u_2+d(n_i^+,h_i^+)-d(n_j^-,h_i^+))$$

where $(n_i^+,h_i^+)$ represents a positive sample, that is, represents a pair of an image candidate region and a natural language having a semantic relationship, and $(n_i^+,h_k^-)$ and $(n_j^-,h_i^+)$ represent negative samples, that is, represent a pair of an image candidate region and a natural language that are not related. $(n_i^+,h_i^+)$ is a positive sample. A corresponding negative sample $(n_i^+, h_k^-)$ is taken for $n_i^+$. With the learning of this matching function, the matching relationship between positive samples is higher than the matching relationship between negative samples. $(n_i^+,h_i^+)$ is a positive sample. A corresponding negative sample $(n_j^-,h_i^+)$ is taken for $h_i^+$. With the learning of this matching function, the matching relationship between positive samples is higher than the matching relationship between negative samples.

Next, in the embodiments of the present disclosure, a manner of determining a target loss function according to the first to-be-trained text, the second to-be-trained text, the first to-be-trained image candidate region, and the second to-be-trained image candidate region is provided. In the foregoing manner, the defined target loss function describes a matching relationship between an image and a natural language in two different directions. One direction is to associate an image candidate region with a natural language, and the other direction is to associate a natural language with an image candidate region. A main objective of designing this target loss function is to make the similarity of a pair of an image candidate region and a natural language that are semantically associated higher than that of a pair of an image candidate region and a natural language that are not semantically associated, thereby improving the accuracy of model training.

Figure 5:
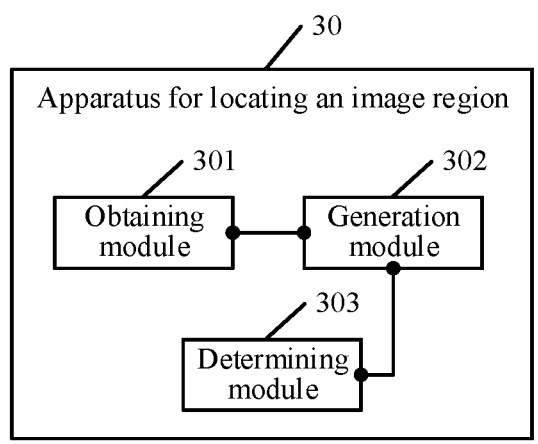
FIG. 5 is a schematic diagram of an embodiment of an apparatus for locating an image region according to an embodiment of the present disclosure.

An apparatus for locating an image region in the present disclosure is described below in detail. Referring to FIG. 5, FIG. 5 is a schematic diagram of an embodiment of an apparatus for locating an image region according to an embodiment of the present disclosure. The apparatus 30 for locating an image region includes:

an obtaining module 301, configured to obtain an image candidate region set in a to-be-located image, the image candidate region set including N image candidate regions, N being an integer greater than or equal to 1;

a generation module 302, configured to generate a region semantic information set according to the image candidate region set (that is, an image candidate region set in a to-be-located image) obtained by the obtaining module 301, the region semantic information set including N pieces of region semantic information, each piece of region semantic information corresponding to one image candidate region (that is, each piece of region semantic information in the region semantic information set corresponding to one image candidate region in the image candidate region set);

the obtaining module 301, further configured to obtain, by using a GCN, an enhanced semantic information set corresponding to the region semantic information set generated by the generation module 302, the enhanced semantic information set including N pieces of enhanced semantic information, each piece of enhanced semantic information corresponding to one piece of region semantic information (that is, each piece of enhanced semantic information in the enhanced semantic information set corresponding to one piece of region semantic information in the region semantic information set), the GCN being configured to build an association relationship between various pieces of region semantic information;

the obtaining module 301, further configured to obtain a text feature set corresponding to a to-be-located text, the to-be-located text including T words, the text feature set including T word features, each word corresponding to one word feature, T being an integer greater than or equal to 1 (that is, each word in the to-be-located text corresponding to one word feature in the text feature set);

the obtaining module 301, further configured to obtain a matching degree between the text feature set (that is, a text feature set corresponding to a to-be-located text) and the each piece of enhanced semantic information by using an image region locating network model, the image region locating network model being configured to determine a matching relationship between the image candidate region and the to-be-located text; and a determining module 303, configured to determine a target image candidate region from the image candidate region set according to the matching degree between the text feature set and the each piece of enhanced semantic information obtained by the obtaining module 301.

In this embodiment, the obtaining module 301 obtains an image candidate region set in a to-be-located image, the image candidate region set including N image candidate regions, N being an integer greater than or equal to 1, the generation module 302 generates a region semantic information set according to the image candidate region set obtained by the obtaining module 301, the region semantic information set including N pieces of region semantic information, each piece of region semantic information corresponding to one image candidate region, the obtaining module 301 obtains, by using a GCN, an enhanced semantic information set corresponding to the region semantic information set generated by the generation module 302, the enhanced semantic information set including N pieces of enhanced semantic information, each piece of enhanced semantic information corresponding to one piece of region semantic information, the GCN being configured to build an association relationship between various pieces of region semantic information, the obtaining module 301 obtains a text feature set corresponding to a to-be-located text, the to-be-located text including T words, the text feature set including T word features, each word corresponding to one word feature, T being an integer greater than or equal to 1, the obtaining module 301 obtains a matching degree between the text feature set and the each piece of enhanced semantic information by using an image region locating network model, the image region locating network model being configured to determine a matching relationship between the image candidate region and the to-be-located text, and the determining module 303 determines a target image candidate region from the image candidate region set according to the matching degree between the text feature set and the each piece of enhanced semantic information obtained by the obtaining module 301.

In the embodiments of the present disclosure, an apparatus for locating an image region is provided. The apparatus first obtains an image candidate region set in a to-be-located image, the image candidate region set including N image candidate regions, then generates a region semantic information set according to the image candidate region set, each piece of region semantic information corresponding to one image candidate region, then obtains the enhanced semantic information set corresponding to the region semantic information set by using a GCN, each piece of enhanced semantic information corresponding to one piece of region semantic information, the GCN being configured to build an association relationship between various pieces of region semantic information, in addition, obtains a text feature set corresponding to a to-be-located text, next, obtains the matching degree between the text feature set and the each piece of enhanced semantic information by using an image region locating network model, and finally, determines a target image candidate region from the image candidate region set according to the matching degree between the text feature set and the each piece of enhanced semantic information. In the foregoing manner, a semantic representation between image candidate regions can be effectively enhanced by using a GCN, and a spatial relationship between image candidate regions is considered, which is beneficial to improving the accuracy of locating an image region, thereby improving the image understanding capability.

Based on the foregoing embodiment corresponding to FIG. 5, in another embodiment of the apparatus 30 for locating an image region provided in this embodiment of the present disclosure, the generation module 302 is specifically configured to:
obtain the region semantic information corresponding to each image candidate region by using a CNN, the image candidate region including region information, the region information including position information of the image candidate region in the to-be-located image and size information of the image candidate region; and
generate the region semantic information set according to the N pieces of region semantic information when region semantic information corresponding to N image candidate regions is obtained.

Next, in the embodiments of the present disclosure, a manner of generating a region semantic information set is provided. Region semantic information corresponding to an image candidate region is first obtained by using a CNN. The image candidate region includes region information. The region information includes the position information of the image candidate region in the to-be-located image and the size information of the image candidate region. A region semantic information set is generated according to N pieces of region semantic information when region semantic information corresponding to N image candidate regions is obtained. In the foregoing manner, region semantic information of each image candidate region can be extracted by using a CNN. The CNN is a feed-forward neural network. Artificial neurons in the CNN may respond to surrounding units in a partial coverage area, and therefore there is excellent performance for large-scale image processing. In this way, the accuracy of information extraction is improved.

Based on the foregoing embodiment corresponding to FIG. 5, in another embodiment of the apparatus 30 for locating an image region provided in this embodiment of the present disclosure, the obtaining module 301 is specifically configured to:
obtain first region semantic information and second region semantic information from the region semantic information set, the first region semantic information being any one piece of region semantic information in the region semantic information set, the second region semantic information being any one piece of region semantic information in the region semantic information set;
obtain strength of a connecting edge between the first region semantic information and the second region semantic information;
normalize the strength of the connecting edge between the first region semantic information and the second region semantic information, to obtain normalized strength;
determine a target connection matrix according to normalized strength between the various pieces of region semantic information in the region semantic information set; and
determine the enhanced semantic information set corresponding to the target connection matrix by using the GCN.

Next, in the embodiments of the present disclosure, a manner of obtaining an enhanced semantic information set by using a GCN is provided. First, first region semantic information and second region semantic information are obtained from a region semantic information set. Strength of a connecting edge between the first region semantic information and the second region semantic information is then obtained. Next, the strength of the connecting edge between the first region semantic information and the second region semantic information is normalized, to obtain normalized strength. a target connection matrix is then determined according to the normalized strength between various pieces of region semantic information in the region semantic information set. Finally, an enhanced semantic information set corresponding to the target connection matrix is determined by using a GCN. In the foregoing manner, a semantic relationship between image candidate regions is built by using a GCN. In this way, spatial information and a semantic relationship are fully considered, thereby improving image-based locating performance.

Based on the foregoing embodiment corresponding to FIG. 5, in another embodiment of the apparatus 30 for locating an image region provided in this embodiment of the present disclosure, the obtaining module 301 is specifically configured to:
generate a connection matrix according to the normalized strength between the various pieces of region semantic information in the region semantic information set; and
generate the target connection matrix according to the connection matrix and an identity matrix.

Next, in the embodiments of the present disclosure, a manner of determining a target connection matrix according to the normalized strength between various pieces of region semantic information in the region semantic information set is provided. That is, a connection matrix is first generated according to the normalized strength between various pieces of region semantic information in the region semantic information set. A target connection matrix is then generated according to the connection matrix and the identity matrix. In the foregoing manner, with a processing measure of normalization, the absolute values of values in a physical system may be turned into a relative value relationship, thereby simplifying calculation and reducing the magnitude. In addition, to further enhance the information, an identity matrix is further added to the corresponding connection matrix, to form a target connection matrix.

Based on the foregoing embodiment corresponding to FIG. 5, in another embodiment of the apparatus 30 for locating an image region provided in this embodiment of the present disclosure, the obtaining module is specifically configured to calculate the enhanced semantic information set in the following manner:

$$n_i^k = \sum_{j \in neighboring(i)} (w_j^k(n_j^{k-1}) + b_j^k) E_{ij},$$

where $n_i^k$ represents an $i^{th}$ piece of enhanced semantic information corresponding to a $k^{th}$ layer of GCN, $n_j^{k-1}$ represents a $j^{th}$ piece of enhanced semantic information corresponding to a $(k-1)^{th}$ layer of GCN, $w_j^k$ represents a first network parameter of the $k^{th}$ layer of GCN, $b_j^k$ represents a second network parameter of the $k^{th}$ layer of GCN, $j \in$ neighboring(i) represents that a $j^{th}$ node is a neighboring node of an $i^{th}$ node, and $E_{ij}$ represents an element in the target connection matrix.

Further, in the embodiments of the present disclosure, a specific manner of an enhanced semantic information set corresponding to the target connection matrix is determined by using a GCN is provided. In the foregoing manner, a specific calculation manner is provided for GCN-based calculation, thereby improving the feasibility and operability of the solution.

Based on the foregoing embodiment corresponding to FIG. 5, in another embodiment of the apparatus 30 for locating an image region provided in this embodiment of the present disclosure, the obtaining module 301 is specifically configured to:
obtain the to-be-located text;
obtain a text vector sequence according to the to-be-located text, the text vector sequence including T word vectors, each word vector corresponding to one word;
encode each word vector in the text vector sequence, to obtain a text feature; and
generate the text feature set according to the T text features when text features corresponding to the T word vectors are obtained.

Next, in the embodiments of the present disclosure, a method for obtaining a text feature set is provided. That is, a to-be-located text is first obtained. A text vector sequence is then obtained according to the to-be-located text. The text vector sequence includes T word vectors. Each word vector corresponds to one word. Next, each word vector in the text vector sequence is encoded, to obtain a text feature. A text feature set is generated according to the T text features when text features corresponding to the T word vectors are obtained. In the foregoing manner, the to-be-located text may be represented in a feature form, to further facilitate subsequent model prediction, thereby improving the feasibility and operability of the solution.

Based on the foregoing embodiment corresponding to FIG. 5, in another embodiment of the apparatus 30 for locating an image region provided in this embodiment of the present disclosure, the obtaining module 301 is specifically configured to obtain the text feature in the following manner:

$$h_t = LSTM(w_t, h_{t-1}),$$

where $h_t$ represents a $t^{th}$ text feature in the text feature set, LSTM( ) represents performing encoding by using a LSTM network, $w_t$ represents a $t^{th}$ word vector in the text vector sequence, and $h_{t-1}$ represents a $(t-1)^{th}$ text feature in the text feature set.

Next, in the embodiments of the present disclosure, a manner of obtaining a text feature is provided. That is, an RNN with an LSTM structure is used to encode a word vector. In the foregoing manner, with a network with an LSTM structure, a vanishing gradient problem caused by gradual reduction in a backpropagation process can be resolved. Specifically, in a language processing task, the LSTM is suitable for processing problems related to temporal heights, for example, machine translation, dialog generation, and encoding and decoding.

Figure 6:
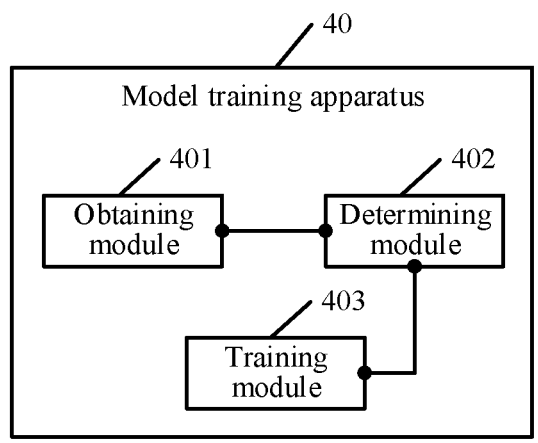
FIG. 6 is a schematic diagram of an embodiment of a model training apparatus according to an embodiment of the present disclosure.

A model training apparatus in the present disclosure is described below in detail. Referring to FIG. 6, FIG. 6 is a schematic diagram of an embodiment of a model training apparatus according to an embodiment of the present disclosure. The model training apparatus 40 includes:

an obtaining module 401, configured to obtain a to-be-trained text set and a to-be-trained image candidate region set, the to-be-trained text set including a first to-be-trained text and a second to-be-trained text, the to-be-trained image candidate region set including a first to-be-trained image candidate region and a second to-be-trained image candidate region, the first to-be-trained text and the first to-be-trained image candidate region having a matching relationship, the first to-be-trained text and the second to-be-trained image candidate region having no matching relationship, the second to-be-trained text and the second to-be-trained image candidate region having a matching relationship, the second to-be-trained text and the first to-be-trained image candidate region having no matching relationship;

a determining module 402, configured to determine a target loss function according to the first to-be-trained text, the second to-be-trained text, the first to-be-trained image candidate region, and the second to-be-trained image candidate region obtained by the obtaining module 401; and a training module 403, configured to train a to-be-trained image region locating network model by using the target loss function determined by the determining module 402, to obtain an image region locating network model, the image region locating network model being configured to determine a matching relationship between an image candidate region and a to-be-located text according to a text feature set and enhanced semantic information, the enhanced semantic information and the image candidate region having a correspondence, the text feature set and the to-be-located text having a correspondence.

In this embodiment, the obtaining module 401 is configured to obtain a to-be-trained text set and a to-be-trained image candidate region set, the to-be-trained text set including a first to-be-trained text and a second to-be-trained text, the to-be-trained image candidate region set including a first to-be-trained image candidate region and a second to-be-trained image candidate region, the first to-be-trained text and the first to-be-trained image candidate region having a matching relationship, the first to-be-trained text and the second to-be-trained image candidate region having no matching relationship, the second to-be-trained text and the second to-be-trained image candidate region having a matching relationship, the second to-be-trained text and the first to-be-trained image candidate region having no matching relationship; the determining module 402 determines a target loss function according to the first to-be-trained text, the second to-be-trained text, the first to-be-trained image candidate region, and the second to-be-trained image candidate region obtained by the obtaining module 401; and the training module 403 trains a to-be-trained image region locating network model by using the target loss function determined by the determining module 402, to obtain an image region locating network model, the image region locating network model being configured to determine a matching relationship between an image candidate region and a to-be-located text according to a text feature set and enhanced semantic information, the enhanced semantic information and the image candidate region having a correspondence, the text feature set and the to-be-located text having a correspondence.

In the embodiments of the present disclosure, a model training apparatus is provided. The model training apparatus first obtains a to-be-trained text set and a to-be-trained image candidate region set, the to-be-trained text set including a first to-be-trained text and a second to-be-trained text, the to-be-trained image candidate region set including a first to-be-trained image candidate region and a second to-be-trained image candidate region, then determining a target loss function according to the first to-be-trained text, the second to-be-trained text, the first to-be-trained image candidate region, and the second to-be-trained image candidate region, and finally, trains a to-be-trained image region locating network model by using the target loss function, to obtain an image region locating network model. In the foregoing manner, the image region locating network model configured to determine a matching relationship between an image candidate region and a text can be obtained through training, and the used target function can be used to measure the similarity between an image candidate region and a text, to obtain the matching relationship between a text and an image candidate region through learning, thereby improving the feasibility and operability of the solution.

Based on the foregoing embodiment corresponding to FIG. 6, in another embodiment of the model training apparatus 40 provided in this embodiment of the present disclosure, the determining module 402 is specifically configured to determine the target loss function in the following manner:

$$L(n_i^+, h_i^+, n_j^-, h_k^-) = \lambda_1 \max(0, u_1 + d(n_i^+, h_i^+) - d(n_i^+, h_k^-)) + \lambda_2 \max(0, u_2 + d(n_i^+, h_i^+) - d(n_j^-, h_i^+))$$

where L represents the target loss function, $n_i^+$ represents the first to-be-trained image candidate region, $h_i^+$ represents the first to-be-trained text, $n_j^-$ represents the second to-be-trained image candidate region, $h_k^-$ represents the second to-be-trained text, d( ) represents a to-be-trained data pair, max( ) represents taking the maximum value, $\lambda_1$ represents a first parameter control weight, $\lambda_2$ represents a second parameter control weight, $u_1$ represents a first preset threshold, and $u_2$ represents a second preset threshold.

Next, in the embodiments of the present disclosure, a manner of determining a target loss function according to the first to-be-trained text, the second to-be-trained text, the first to-be-trained image candidate region, and the second to-be-trained image candidate region is provided. In the foregoing manner, the defined target loss function describes a matching relationship between an image and a natural language in two different directions. One direction is to associate an image candidate region with a natural language, and the other direction is to associate a natural language with an image candidate region. A main objective of designing this target loss function is to make the similarity of a pair of an image candidate region and a natural language that are semantically associated higher than that of a pair of an image candidate region and a natural language that are not semantically associated, thereby improving the accuracy of model training.

Figure 7:
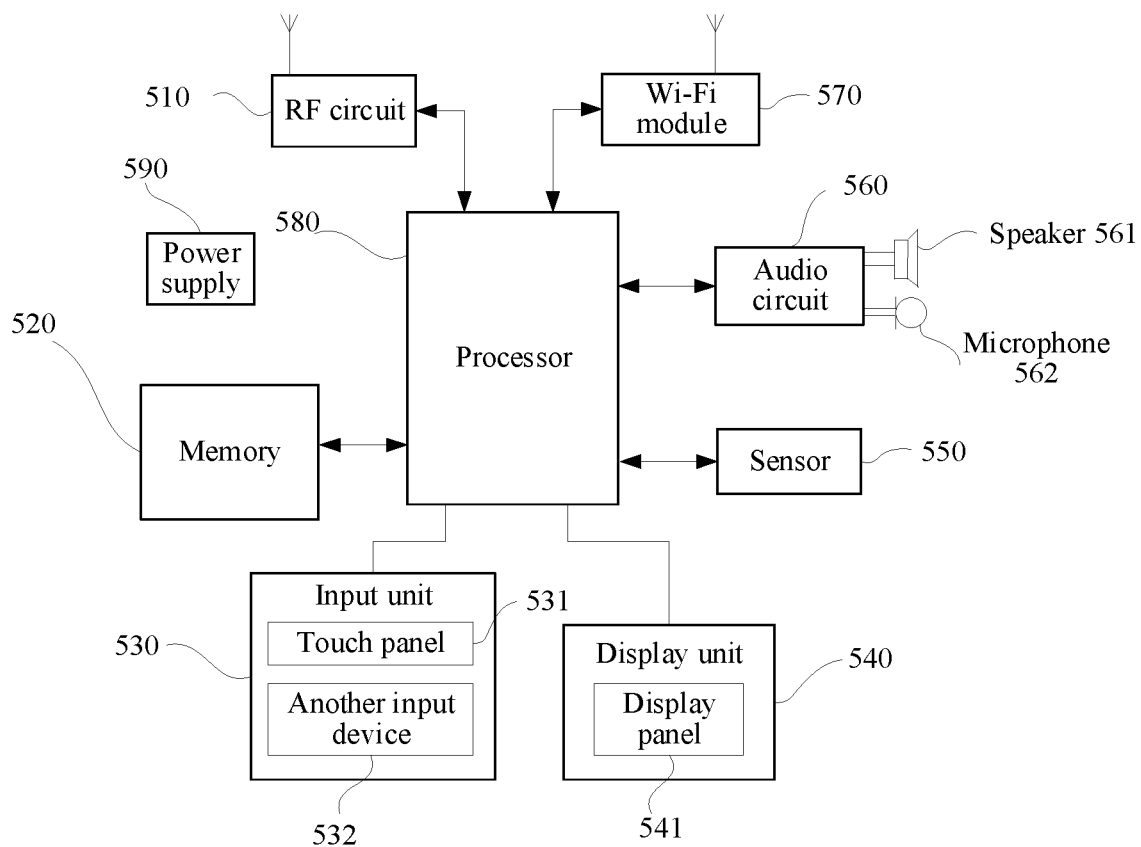
FIG. 7 is a schematic structural diagram of a terminal device according to an embodiment of the present disclosure.

An embodiment of the present disclosure further provides another apparatus for locating an image region, as shown in FIG. 7, and for convenience of description, only parts related to the embodiment of the present disclosure are shown. For specific technical details that are not disclosed, refer to the method part of the embodiments of the present disclosure. The apparatus may be any terminal device including a mobile phone, a tablet computer, a personal digital assistant (PDA), a point of sales (POS), and an on-board computer, and the terminal device being a mobile phone is used as an example.

FIG. 7 is a block diagram of the structure of a part of a mobile phone related to a terminal device according to an embodiment of the present disclosure. Referring to FIG. 7, the mobile phone includes components such as a radio frequency (RF) circuit 510, a memory 520, an input unit 530, a display unit 540, a sensor 550, an audio circuit 560, a Wireless Fidelity (Wi-Fi) module 570, a processor 580, and a power supply 590. A person skilled in the art may understand that the structure of the mobile phone shown in FIG. 7 does not constitute a limitation on the mobile phone, and the mobile phone may include more components or fewer components than those shown in the figure, or some components may be combined, or a different component deployment may be used.

The following makes a specific description of components of the mobile phone with reference to FIG. 7.

The RF circuit 510 may be configured to receive and send signals during an information receiving and sending process or a call process. Specifically, the RF circuit receives downlink information from a base station, then delivers the downlink information to the processor 580 for processing, and sends designed uplink data to the base station. Usually, the RF circuit 510 includes, but is not limited to, an antenna, at least one amplifier, a transceiver, a coupler, a low noise amplifier (LNA), and a duplexer. In addition, the RF circuit 510 may also communicate with a network and another device through wireless communication. The wireless communication may use any communication standard or protocol, including but not limited to Global System for Mobile Communications (GSM), general packet radio service (GPRS), Code Division Multiple Access (CDMA), Wideband Code Division Multiple Access (WCDMA), Long Term Evolution (LTE), email, Short Messaging Service (SMS), and the like.

The memory 520 may be configured to store a software program and module. The processor 580 runs the software program and module stored in the memory 520, to implement various functional applications and data processing of the mobile phone. The memory 520 may mainly include a program storage area and a data storage area. The program storage area may store an operating system, an application program required by at least one function (such as a sound playback function and an image display function), and the like. The data storage area may store data (such as audio data and an address book) created according to the use of the mobile phone, and the like. In addition, the memory 520 may include a high speed random access memory (RAM), and may also include a non-volatile memory, such as at least one magnetic disk storage device, a flash memory, or another volatile solid-state storage device.

The input unit 530 may be configured to receive input digit or character information, and generate a keyboard signal input related to the user setting and function control of the mobile phone. Specifically, the input unit 530 may include a touch panel 531 and another input device 532. The touch panel 531, which may also be referred to as a touch screen, may collect a touch operation of a user on or near the touch panel (such as an operation of a user on the touch panel 531 or near the touch panel 531 by using any suitable object or accessory such as a finger or a stylus), and drive a corresponding connection apparatus according to a preset program. Optionally, the touch panel 531 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 580. Moreover, the touch controller can receive and execute a command sent from the processor 580. In addition, the touch panel 531 may be implemented by using various types, such as a resistive type, a capacitive type, an infrared type, and a surface acoustic wave type. In addition to the touch panel 531, the input unit 530 may further include another input device 532. Specifically, the input device 532 may include, but is not limited to, one or more of a physical keyboard, a functional key (such as a volume control key or a switch key), a track ball, a mouse, and a joystick.

The display unit 540 may be configured to display information inputted by the user or information provided for the user, and various menus of the mobile phone. The display unit 540 may include a display panel 541. Optionally, the display panel 541 may be configured by using a liquid crystal display (LCD), an organic light-emitting diode (OLED), or the like. Further, the touch panel 531 may cover the display panel 541. After detecting a touch operation on or near the touch panel 531, the touch panel transfers the touch operation to the processor 580, to determine a type of a touch event. Then, the processor 580 provides a corresponding visual output on the display panel 541 according to the type of the touch event. Although in FIG. 7, the touch panel 531 and the display panel 541 are used as two separate parts to implement input and output functions of the mobile phone, in some embodiments, the touch panel 531 and the display panel 541 may be integrated to implement the input and output functions of the mobile phone.

The mobile phone may further include at least one sensor 550 such as an optical sensor, a motion sensor, and other sensors. Specifically, the optical sensor may include an ambient light sensor and a proximity sensor. The ambient light sensor may adjust luminance of the display panel 541 according to brightness of the ambient light. The proximity sensor may switch off the display panel 541 and/or backlight when the mobile phone is moved to the ear. As one type of motion sensor, an acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the mobile phone, are not further described herein.

The audio circuit 560, a loudspeaker 561, and a microphone 562 may provide audio interfaces between a user and the mobile phone. The audio circuit 560 may convert received audio data into an electrical signal and transmit the electrical signal to the speaker 561. The speaker 561 converts the electrical signal into a sound signal for output. On the other hand, the microphone 562 converts a collected sound signal into an electrical signal. The audio circuit 560 receives the electrical signal, converts the electrical signal into audio data, and outputs the audio data to the processor 580 for processing. Then, the processor sends the audio data to, for example, another mobile phone by using the RF circuit 510, or outputs the audio data to the memory 520 for further processing.

Wi-Fi is a short distance wireless transmission technology. The mobile phone may help, by using the Wi-Fi module 570, a user to receive and transmit an email, browse a web page, access stream media, and the like. This provides wireless broadband Internet access for the user. Although FIG. 7 shows the Wi-Fi module 570, it may be understood that the Wi-Fi module is not a necessary component of the mobile phone, and the Wi-Fi module may be omitted as required provided that the scope of the essence of the present disclosure is not changed.

The processor 580 is a control center of the mobile phone, and is connected to various parts of the entire mobile phone by using various interfaces and lines. By running or executing a software program and/or module stored in the memory 520, and invoking data stored in the memory 520, the processor executes various functions of the mobile phone and performs data processing, thereby monitoring the entire mobile phone. Optionally, the processor 580 may include one or more processing units. In some embodiments, the processor 580 may integrate an application processor and a modem processor. The application processor mainly processes an operating system, a user interface, an application program, and the like. The modem processor mainly processes wireless communication. It may be understood that the foregoing modem may either not be integrated into the processor 580.

The mobile phone further includes the power supply 590 (such as a battery) for supplying power to the components. In some embodiments, the power supply may be logically connected to the processor 580 by using a power management system, thereby implementing functions such as charging, discharging and power consumption management by using the power management system.

Although not shown in the figure, the mobile phone may further include a camera, a Bluetooth module, and the like, which are not further described herein.

In this embodiment of the present disclosure, the processor 580 included in the terminal device further has the following functions:

obtaining an image candidate region set in a to-be-located image, the image candidate region set including N image candidate regions, N being an integer greater than or equal to 1;

generating a region semantic information set according to the image candidate region set (that is, an image candidate region set in a to-be-located image), the region semantic information set including N pieces of region semantic information, each piece of region semantic information corresponding to one image candidate region (that is, each piece of region semantic information in the region semantic information set corresponding to one image candidate region in the image candidate region set);

obtaining an enhanced semantic information set corresponding to the region semantic information set by using a GCN, the enhanced semantic information set including N pieces of enhanced semantic information, each piece of enhanced semantic information corresponding to one piece of region semantic information (that is, each piece of enhanced semantic information in the enhanced semantic information set corresponding to one piece of region semantic information in the region semantic information set), the GCN being configured to build an association relationship between various pieces of region semantic information;

obtaining a text feature set corresponding to a to-be-located text, the to-be-located text including T words, the text feature set including T word features, each word corresponding to one word feature, T being an integer greater than or equal to 1 (that is, each word in the to-be-located text corresponding to one word feature in the text feature set);

obtaining a matching degree between the text feature set (that is, a text feature set corresponding to a to-be-located text) and the each piece of enhanced semantic information by using an image region locating network model, the image region locating network model being configured to determine a matching relationship between the image candidate region and the to-be-located text; and determining a target image candidate region from the image candidate region set according to the matching degree between the text feature set and the each piece of enhanced semantic information.

In some embodiments, the processor 580 is configured to perform the following steps:

obtaining the region semantic information corresponding to each image candidate region by using a CNN, the image candidate region including region information, the region information including position information of the image candidate region in the to-be-located image and size information of the image candidate region; and generating the region semantic information set according to the N pieces of region semantic information when region semantic information corresponding to N image candidate regions is obtained.

In some embodiments, the processor 580 is configured to perform the following steps:

obtaining first region semantic information and second region semantic information from the region semantic information set, the first region semantic information being any one piece of region semantic information in the region semantic information set, the second region semantic information being any one piece of region semantic information in the region semantic information set;

obtaining strength of a connecting edge between the first region semantic information and the second region semantic information;

normalizing the strength of the connecting edge between the first region semantic information and the second region semantic information, to obtain normalized strength;

determining a target connection matrix according to normalized strength between the various pieces of region semantic information in the region semantic information set; and determining the enhanced semantic information set corresponding to the target connection matrix by using the GCN.

In some embodiments, the processor 580 is configured to perform the following steps:

generating a connection matrix according to the normalized strength between the various pieces of region semantic information in the region semantic information set; and generating the target connection matrix according to the connection matrix and an identity matrix.

In some embodiments, the processor 580 is configured to perform the following step:

calculating the enhanced semantic information set in the following manner:

$$n_i^k = \sum_{j \in neighboring(i)} \left(w_j^k \left(n_j^{k-1}\right) + b_j^k\right) E_{ij},$$

where $n_i^k$ represents an $i^{th}$ piece of enhanced semantic information corresponding to a $k^{th}$ layer of GCN, $n_j^{k-1}$ represents a $j^{th}$ piece of enhanced semantic information corresponding to a $(k-1)^{th}$ layer of GCN, $w_j^k$ represents a first network parameter of the $k^{th}$ layer of GCN, $b_j^k$ represents a second network parameter of the $k^{th}$ layer of GCN, $j \in neighboring(i)$ represents that a $j^{th}$ node is a neighboring node of an $i^{th}$ node, and $E_{ij}$ represents an element in the target connection matrix.

In some embodiments, the processor 580 is specifically configured to perform the following steps:

obtaining the to-be-located text;

obtaining a text vector sequence according to the to-be-located text, the text vector sequence including T word vectors, each word vector corresponding to one word;

encoding each word vector in the text vector sequence, to obtain a text feature; and generating the text feature set according to the T text features when text features corresponding to the T word vectors are obtained.

In some embodiments, the processor 580 is specifically configured to perform the following step:

obtaining the text feature in the following manner:

$$h_t = \text{LSTM}(w_t, h_{t-1}),$$

where $h_t$ represents a $t^{th}$ text feature in the text feature set, LSTM( ) represents performing encoding by using an LSTM network, $w_t$ represents a $t^{th}$ word vector in the text vector sequence, and $h_{t-1}$ represents a $(t-1)^{th}$ text feature in the text feature set.

Figure 8:
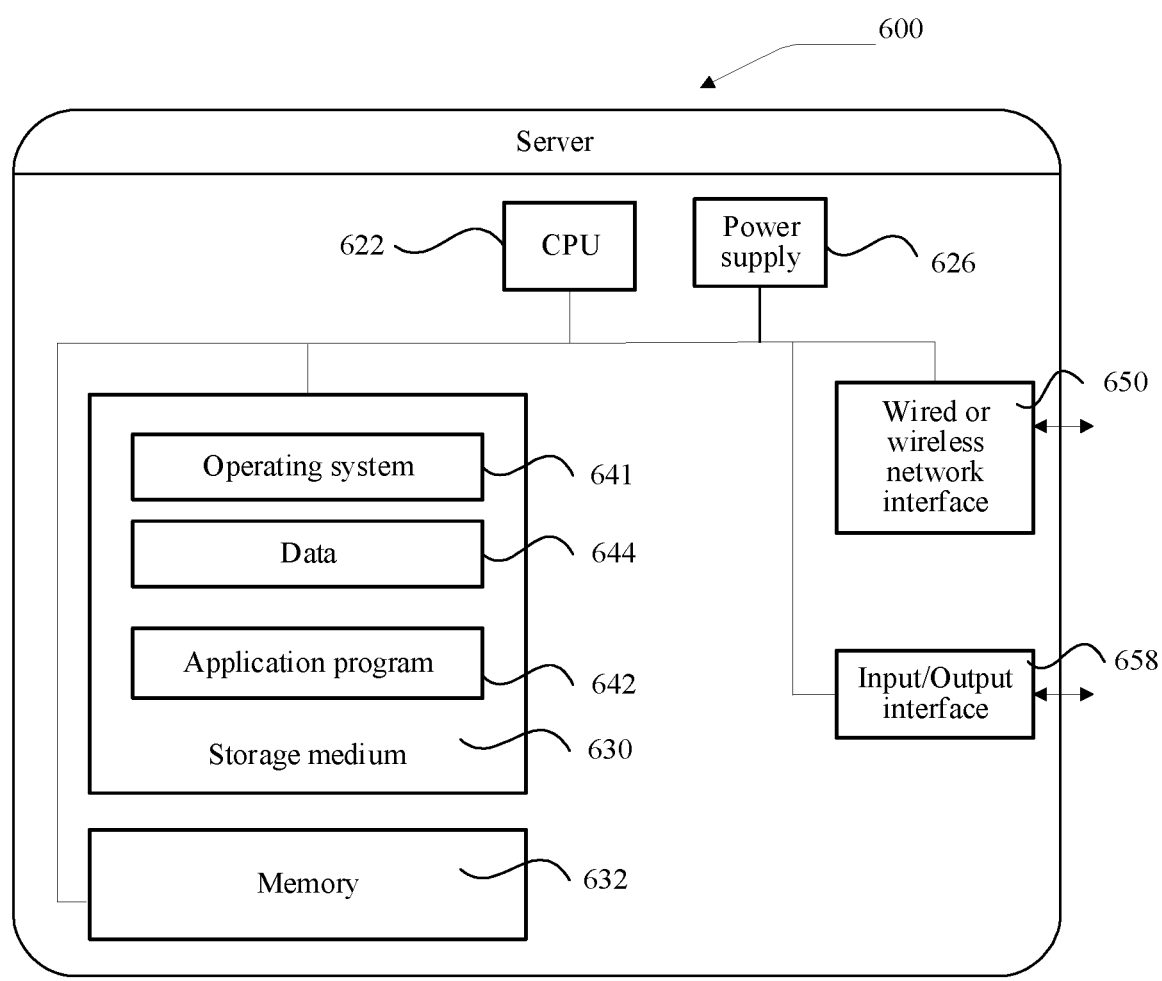
FIG. 8 is a schematic structural diagram of a server according to an embodiment of the present disclosure.

FIG. 8 is a schematic structural diagram of a server according to an embodiment of the present disclosure. A server 600 may vary greatly due to different configurations or performance, and may include one or more central processing units (CPUs) 622 (for example, one or more processors) and a memory 632, and one or more storage media 630 (for example, one or more mass storage devices) that store an application program 642 or data 644. The memory 632 and the storage medium 630 may be transient or persistent storages. A program stored in the storage medium 630 may include one or more modules (which are not marked in the figure), and each module may include a series of instruction operations on the server. Further, the CPU 622 may be set to communicate with the storage medium 630, and perform, on the server 600, the series of instruction operations in the storage medium 630.

The server 600 may further include one or more power supplies 626, one or more wired or wireless network interfaces 650, one or more input/output interfaces 658, and/or one or more operating systems 641 such as Windows Server™, Mac OS X™, Unix™, Linux™ or FreeBSD™.

The steps performed by the server in the foregoing embodiment may be based on the server structure shown in FIG. 8.

In this embodiment of the present disclosure, the CPU 622 included in the server further has the following functions:

obtaining an image candidate region set in a to-be-located image, the image candidate region set including N image candidate regions, N being an integer greater than or equal to 1;

generating a region semantic information set according to the image candidate region set (that is, an image candidate region set in a to-be-located image), the region semantic information set including N pieces of region semantic information, each piece of region semantic information corresponding to one image candidate region (that is, each piece of region semantic information in the region semantic information set corresponding to one image candidate region in the image candidate region set);

obtaining an enhanced semantic information set corresponding to the region semantic information set by using a GCN, the enhanced semantic information set including N pieces of enhanced semantic information, each piece of enhanced semantic information corresponding to one piece of region semantic information (that is, each piece of enhanced semantic information in the enhanced semantic information set corresponding to one piece of region semantic information in the region semantic information set), the GCN being configured to build an association relationship between various pieces of region semantic information;

obtaining a text feature set corresponding to a to-be-located text, the to-be-located text including T words, the text feature set including T word features, each word corresponding to one word feature, T being an integer greater than or equal to 1 (that is, each word in the to-be-located text corresponding to one word feature in the text feature set);

obtaining a matching degree between the text feature set (that is, a text feature set corresponding to a to-be-located text) and the each piece of enhanced semantic information by using an image region locating network model, the image region locating network model being configured to determine a matching relationship between the image candidate region and the to-be-located text; and determining a target image candidate region from the image candidate region set according to the matching degree between the text feature set and the each piece of enhanced semantic information.

In some embodiments, the CPU 622 is specifically configured to perform the following steps:

obtaining the region semantic information corresponding to each image candidate region by using a CNN, the image candidate region including region information, the region information including position information of the image candidate region in the to-be-located image and size information of the image candidate region; and generating the region semantic information set according to the N pieces of region semantic information when region semantic information corresponding to N image candidate regions is obtained.

In some embodiments, the CPU 622 is specifically configured to perform the following steps:

obtaining first region semantic information and second region semantic information from the region semantic information set, the first region semantic information being any one piece of region semantic information in the region semantic information set, the second region semantic information being any one piece of region semantic information in the region semantic information set;

obtaining strength of a connecting edge between the first region semantic information and the second region semantic information;

normalizing the strength of the connecting edge between the first region semantic information and the second region semantic information, to obtain normalized strength;

determining a target connection matrix according to normalized strength between the various pieces of region semantic information in the region semantic information set; and determining the enhanced semantic information set corresponding to the target connection matrix by using the GCN.

In some embodiments, the CPU 622 is specifically configured to perform the following steps:

generating a connection matrix according to the normalized strength between the various pieces of region semantic information in the region semantic information set; and generating the target connection matrix according to the connection matrix and an identity matrix.

In some embodiments, the CPU 622 is specifically configured to perform the following step:

calculating the enhanced semantic information set in the following manner:

$$n_i^k = \sum_{j \in neighboring(i)} \left(w_j^k\left(n_j^{k-1}\right) + b_j^k\right) E_{ij},$$

where $n_i^k$ represents an $i^{th}$ piece of enhanced semantic information corresponding to a $k^{th}$ layer of GCN, $n_j^{k-1}$ represents a $j^{th}$ piece of enhanced semantic information corresponding to a $(k-1)^{th}$ layer of GCN, $w_j^k$ represents a first network parameter of the $k^{th}$ layer of GCN, $b_j^k$ represents a second network parameter of the $k^{th}$ layer of GCN, $j \in neighboring(i)$ represents that a $j^{th}$ node is a neighboring node of an $i^{th}$ node, and $E_{ij}$ represents an element in the target connection matrix.

In some embodiments, the CPU 622 is specifically configured to perform the following steps:

obtaining the to-be-located text;

obtaining a text vector sequence according to the to-be-located text, the text vector sequence including T word vectors, each word vector corresponding to one word;

encoding each word vector in the text vector sequence, to obtain a text feature; and generating the text feature set according to the T text features when text features corresponding to the T word vectors are obtained.

In some embodiments, the CPU 622 is specifically configured to perform the following step:

$$h_t = LSTM(w_t, h_{t-1}),$$

where $h_t$ represents a $t^{th}$ text feature in the text feature set, LSTM( ) represents performing encoding by using an LSTM network, $w_t$ represents a $t^{th}$ word vector in the text vector sequence, and $h_{t-1}$ represents a $(t-1)^{th}$ text feature in the text feature set.

In this embodiment of the present disclosure, the CPU 622 included in the server further has the following functions:

obtaining a to-be-trained text set and a to-be-trained image candidate region set, the to-be-trained text set including a first to-be-trained text and a second to-be-trained text, the to-be-trained image candidate region set including a first to-be-trained image candidate region and a second to-be-trained image candidate region, the first to-be-trained text and the first to-be-trained image candidate region having a matching relationship, the first to-be-trained text and the second to-be-trained image candidate region having no matching relationship, the second to-be-trained text and the second to-be-trained image candidate region having a matching relationship, the second to-be-trained text and the first to-be-trained image candidate region having no matching relationship;

determining a target loss function according to the first to-be-trained text, the second to-be-trained text, the first to-be-trained image candidate region, and the second to-be-trained image candidate region; and training a to-be-trained image region locating network model by using the target loss function, to obtain an image region locating network model, the image region locating network model being configured to determine a matching relationship between an image candidate region and a to-be-located text according to a text feature set and enhanced semantic information, the enhanced semantic information and the image candidate region having a correspondence, the text feature set and the to-be-located text having a correspondence.

In some embodiments, the CPU 622 is specifically configured to perform the following step:

determining the target loss function in the following manner:

$$L(n_i^+, h_i^+, n_j^-, h_k^-) = \lambda_1 \max(0, u_1 + d(n_i^+, h_i^+) - d(n_i^+, h_k^-)) + \lambda_2 \max(0, u_2 + d(n_i^+, h_i^+) - d(n_j^-, h_i^+))$$

where L represents the target loss function, $n_i^+$ represents the first to-be-trained image candidate region, $h_i^+$ represents the first to-be-trained text, $n_j^-$ represents the second to-be-trained image candidate region, $h_k^-$ represents the second to-be-trained text, d( ) represents a to-be-trained data pair, max( ) represents taking the maximum value, $\lambda_1$ represents a first parameter control weight, $\lambda_2$ represents a second parameter control weight, $u_1$ represents a first preset threshold, and $u_2$ represents a second preset threshold.

A person skilled in the art can clearly understand that for convenience and conciseness of description, for specific working processes of the foregoing systems, devices and units, reference may be made to the corresponding processes in the foregoing method embodiments, and details are not described herein again.

In the embodiments provided in the present disclosure, it is to be understood that the disclosed system, apparatus, and method may be implemented in other manners. For example, the described apparatus embodiment is merely an example. For example, the unit division is merely a logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separated, and the components displayed as units may or may not be physical units, and may be located in one place or may be distributed over a plurality of network units. Some or all of the units may be selected according to actual needs to achieve the objectives of the solutions of the embodiments.

In addition, functional units in the embodiments of the present disclosure may be integrated into one processing unit, or each of the units may be physically separated, or two or more units may be integrated into one unit. The integrated unit may be implemented in the form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the related art, or all or a part of the technical solutions may be implemented in the form of a software product. The computer software product is stored in a storage medium and includes several instructions for instructing a computer device (which may be a PC, a server or a network device) to perform all or some of the steps of the methods described in the embodiments of the present disclosure. The foregoing storage medium includes: any medium that can store program code, such as a USB flash drive, a removable hard disk, a read-only memory (ROM), a RAM, a magnetic disk or an optical disc.

An embodiment of the present disclosure further provides a non-transitory computer-readable storage medium, the computer-readable storage medium storing instructions, the instructions, when run on a computer, causing the computer to perform any possible implementation of the method for locating an image region provided in the foregoing embodiments.

In some embodiments, the instructions stored in the computer-readable storage medium are configured to perform the following steps:

generating a region semantic information set according to an image candidate region set in a to-be-located image, each piece of region semantic information in the region semantic information set corresponding to one image candidate region in the image candidate region set;

obtaining an enhanced semantic information set corresponding to the region semantic information set by using a GCN, each piece of enhanced semantic information in the enhanced semantic information set corresponding to one piece of region semantic information in the region semantic information set, the GCN being configured to build an association relationship between various pieces of region semantic information;

obtaining a matching degree between a text feature set corresponding to a to-be-located text and the each piece of enhanced semantic information by using an image region locating network model, the image region locating network model being configured to determine a matching relationship between the image candidate region and the to-be-located text, each word in the to-be-located text corresponding to one word feature in the text feature set; and determining a target image candidate region from the image candidate region set according to the matching degree between the text feature set and each piece of enhanced semantic information.

In some embodiments, the instructions stored in the computer-readable storage medium are configured to perform the following steps:

obtaining the region semantic information corresponding to each image candidate region by using a CNN, the image candidate region including region information, the region information including position information of the image candidate region in the to-be-located image and size information of the image candidate region; and generating the region semantic information set according to the N pieces of region semantic information when region semantic information corresponding to N image candidate regions is obtained, N being an integer greater than or equal to 1.

In some embodiments, the instructions stored in the computer-readable storage medium are configured to perform the following steps:

obtaining first region semantic information and second region semantic information from the region semantic information set, the first region semantic information being any one piece of region semantic information in the region semantic information set, the second region semantic information being any one piece of region semantic information in the region semantic information set;

obtaining strength of a connecting edge between the first region semantic information and the second region semantic information;

normalizing the strength of the connecting edge between the first region semantic information and the second region semantic information, to obtain normalized strength;

determining a target connection matrix according to normalized strength between the various pieces of region semantic information in the region semantic information set; and determining the enhanced semantic information set corresponding to the target connection matrix by using the GCN.

In some embodiments, the instructions stored in the computer-readable storage medium are configured to perform the following steps:

generating a connection matrix according to the normalized strength between the various pieces of region semantic information in the region semantic information set; and generating the target connection matrix according to the connection matrix and an identity matrix.

In some embodiments, the instructions stored in the computer-readable storage medium are configured to perform the following step:

calculating the enhanced semantic information set in the following manner:

$$n_i^k = \sum_{j \in neighboring(i)} (w_j^k(n_j^{k-1}) + b_j^k)E_{ij},$$

where $n_i^k$ represents an $i^{th}$ piece of enhanced semantic information corresponding to a $k^{th}$ layer of GCN, $n_j^{k-1}$ represents a $j^{th}$ piece of enhanced semantic information corresponding to a $(k-1)^{th}$ layer of GCN, $w_j^k$ represents a first network parameter of the $k^{th}$ layer of GCN, $b_j^k$ represents a second network parameter of the $k^{th}$ layer of GCN, $j \in neighboring(i)$ represents that a $j^{th}$ node is a neighboring node of an $i^{th}$ node, and $E_{ij}$ represents an element in the target connection matrix.

In some embodiments, the instructions stored in the computer-readable storage medium are configured to perform the following steps:

obtaining the to-be-located text;

obtaining a text vector sequence according to the to-be-located text, the text vector sequence including T word vectors, each word vector corresponding to one word, T being an integer greater than or equal to 1;

encoding each word vector in the text vector sequence, to obtain a text feature; and generating the text feature set according to the T text features when text features corresponding to the T word vectors are obtained.

In some embodiments, the instructions stored in the computer-readable storage medium are configured to perform the following step:

obtaining the text feature in the following manner:

$$h_t = LSTM(w_t, h_{t-1}),$$

where $h_t$ represents a $t^{th}$ text feature in the text feature set, LSTM( ) represents performing encoding by using an LSTM network, $w_t$ represents a $t^{th}$ word vector in the text vector sequence, and $h_{t-1}$ represents a $(t-1)^{th}$ text feature in the text feature set.

An embodiment of the present disclosure further provides a computer-readable storage medium, the computer-readable storage medium storing instructions, the instructions, when run on a computer, causing the computer to perform any possible implementation of the model training method provided in the foregoing embodiments.

In some embodiments, the instructions stored in the computer-readable storage medium are configured to perform the following steps:

obtaining a to-be-trained text set and a to-be-trained image candidate region set, the to-be-trained text set including a first to-be-trained text and a second to-be-trained text, the to-be-trained image candidate region set including a first to-be-trained image candidate region and a second to-be-trained image candidate region, the first to-be-trained text and the first to-be-trained image candidate region having a matching relationship, the first to-be-trained text and the second to-be-trained image candidate region having no matching relationship, the second to-be-trained text and the second to-be-trained image candidate region having a matching relationship, the second to-be-trained text and the first to-be-trained image candidate region having no matching relationship;

determining a target loss function according to the first to-be-trained text, the second to-be-trained text, the first to-be-trained image candidate region, and the second to-be-trained image candidate region; and training a to-be-trained image region locating network model by using the target loss function, to obtain an image region locating network model, the image region locating network model being configured to determine a matching relationship between an image candidate region and a to-be-located text according to a text feature set and enhanced semantic information, the enhanced semantic information and the image candidate region having a correspondence, the text feature set and the to-be-located text having a correspondence.

In some embodiments, the instructions stored in the computer-readable storage medium are configured to perform the following step:

determining the target loss function in the following manner:

$$L(n_i^+,h_i^+,n_j^-,h_k^-)=\lambda_1 \max(0,u_1+d(n_i^+,h_i^+)-d(n_i^+,h_k^-))+ \lambda_2 \max(0,u_2+d(n_i^+,h_i^+)-d(n_j^-,h_i^+))$$

where L represents the target loss function, $n_i^+$ represents the first to-be-trained image candidate region, $h_i^+$ represents the first to-be-trained text, $n_j^-$ represents the second to-be-trained image candidate region, $h_k^-$ represents the second to-be-trained text, d( ) represents a to-be-trained data pair, max( ) represents taking the maximum value, $\lambda_1$ represents a first parameter control weight, $\lambda_2$ represents a second parameter control weight, $u_1$ represents a first preset threshold, and $u_2$ represents a second preset threshold.

An embodiment of the present disclosure further provides a computer program product including instructions, the instructions, when executed by a computer, cause the computer to perform any possible implementation of the method for locating an image region provided in the foregoing embodiments or perform any possible implementation of the model training method provided in the foregoing embodiments.

The foregoing embodiments are merely intended for describing the technical solutions of the present disclosure, but not for limiting the present disclosure. Although the present disclosure is described in detail with reference to the foregoing embodiments, persons of ordinary skill in the art are to understand that they may still make modifications to the technical solutions described in the foregoing embodiments or make equivalent replacements to some technical features thereof, without departing from the spirit and scope of the technical solutions of the embodiments of the present disclosure.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

As used herein, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The division of the foregoing functional modules is merely used as an example for description when the systems, devices, and apparatus provided in the foregoing embodiments performs locating an image region and/or model training. In practical application, the foregoing functions may be allocated to and completed by different functional modules according to requirements, that is, an inner structure of a device is divided into different functional modules to implement all or a part of the functions described above.

What is claimed is:

1. A method for locating an image region, comprising:
   determining one or more regions in an image, each of the regions corresponding to a respective candidate object in the image;
   generating a set of semantic information for the one or more regions, each semantic information having a one-to-one correspondence with a corresponding candidate object in one of the one or more regions;
   obtaining a strength of a connecting edge between two pieces of semantic information within the set of semantic information;
   normalizing the strength of the connecting edge between the two pieces of semantic information within the set of semantic information to obtain a normalized strength;
   determining a target connection matrix according to normalized strengths between pieces of semantic information within the set of semantic information;
   determining a set of enhanced semantic information corresponding to the target connection matrix using a graph convolutional network (GCN), each enhanced semantic information having a one-to-one correspondence with a corresponding one of the set of semantic information, the GCN being configured to build an association relationship between various pieces of semantic information;
   obtaining a matching degree between a text feature set corresponding to a to-be-located text and each of the respective enhanced semantic information using an image region locating network model, the image region locating network model being configured to determine a matching relationship between the image candidate region and the to-be-located text, each word in the to-be-located text corresponding to one word feature in the text feature set; and
   determining a target image candidate region from the one or more regions according to the matching degree between the text feature set and each of the respective enhanced semantic information.

2. The method according to claim 1, wherein generating the respective semantic information comprises:
   obtaining the respective semantic information for each of the regions using a convolutional neural network (CNN), each of the regions comprising position and size information of the respective candidate object in the region.

3. The method according to claim 1, wherein determining the target connection matrix further includes:

generating a connection matrix according to the normalized strengths between the pieces of semantic information in the set of semantic information; and generating the target connection matrix according to the connection matrix and an identity matrix.

4. The method according to claim 1, wherein determining the set of enhanced semantic information comprises:

calculating the set of enhanced semantic information in the following manner:

$$n_i^k = \sum_{j \in neighboring(i)} \left(w_j^k\left(n_j^{k-1}\right) + b_j^k\right) E_{ij},$$

wherein $n_i^k$ represents an $i^{th}$ piece of enhanced semantic information corresponding to a $k^{th}$ layer of GCN, $n_j^{k-1}$ represents a $j^{th}$ piece of enhanced semantic information corresponding to a $(k-1)^{th}$ layer of GCN, $w_j^k$ represents a first network parameter of the $k^{th}$ layer of GCN, $b_j^k$ represents a second network parameter of the $k^{th}$ layer of GCN, $j \in neighboring(i)$ represents that a $j^{th}$ node is a neighboring node of an $i^{th}$ node, and $E_{ij}$ represents an element in the target connection matrix.

5. The method according to any claim 1, further comprising:

before obtaining the matching degree:
obtaining the to-be-located text;
obtaining a text vector sequence according to the to-be-located text, the text vector sequence comprising one or more word vectors, each word vector corresponding to one word;
encoding each word vector in the text vector sequence to obtain a text feature; and
generating the text feature set according to the one or more text features based on the encoding.

6. The method according to claim 5, wherein the encoding comprises:

obtaining the text feature, comprising:

$$h_t = LSTM(w_t, h_{t-1}),$$

wherein $h_t$ represents a $t^{th}$ text feature in the text feature set, LSTM( ) represents performing encoding by using a Long Short-Term Memory (LSTM) network, $w_t$ represents a $t^{th}$ word vector in the text vector sequence, and $h_{t-1}$ represents a $(t-1)^{th}$ text feature in the text feature set.

7. A computing device comprising:
one or more processors; and
memory storing one or more programs, the one or more programs comprising instructions that, when executed by the one or more processors, cause the one or more processors to perform operations comprising:
determining one or more regions in an image, each of the regions corresponding to a respective candidate object in the image;
generating a set of semantic information for the one or more regions, each semantic information having a one-to-one correspondence with a corresponding candidate object in one of the one or more regions;
obtaining a strength of a connecting edge between two pieces of semantic information within the set of semantic information;
normalizing the strength of the connecting edge between the two pieces of semantic information within the set of semantic information to obtain a normalized strength;
determining a target connection matrix according to normalized strengths between pieces of semantic information within the set of semantic information;
determining a set of enhanced semantic information corresponding to the target connection matrix using a graph convolutional network (GCN), each enhanced semantic information having a one-to-one correspondence with a corresponding one of the set of semantic information, the GCN being configured to build an association relationship between various pieces of semantic information;
obtaining a matching degree between a text feature set corresponding to a to-be-located text and each of the respective enhanced semantic information using an image region locating network model, the image region locating network model being configured to determine a matching relationship between the image candidate region and the to-be-located text, each word in the to-be-located text corresponding to one word feature in the text feature set; and
determining a target image candidate region from the one or more regions according to the matching degree between the text feature set and each of the respective enhanced semantic information.

8. The computing device according to claim 7, wherein generating the respective semantic information comprises:
obtaining the respective semantic information for each of the regions using a convolutional neural network (CNN), each of the regions comprising position and size information of the respective candidate object in the region.

9. The computing device according to claim 7, wherein determining the target connection matrix further includes:
generating a connection matrix according to the normalized strengths between the pieces of semantic information in the set of semantic information; and
generating the target connection matrix according to the connection matrix and an identity matrix.

10. The computing device according to claim 7, wherein determining the set of enhanced semantic information comprises:
calculating the set of enhanced semantic information in the following manner:

$$n_i^k = \sum_{j \in neighboring(i)} \left(w_j^k\left(n_j^{k-1}\right) + b_j^k\right) E_{ij},$$

wherein $n_i^k$ represents an $i^{th}$ piece of enhanced semantic information corresponding to a $k^{th}$ layer of GCN, $n_j^{k-1}$ represents a $j^{th}$ piece of enhanced semantic information corresponding to a $(k-1)^{th}$ layer of GCN, $w_j^k$ represents a first network parameter of the $k^{th}$ layer of GCN, $b_j^k$ represents a second network parameter of the $k^{th}$ layer of GCN, $j \in neighboring(i)$ represents that a $j^{th}$ node is a neighboring node of an $i^{th}$ node, and $E_{ij}$ represents an element in the target connection matrix.

11. The computing device according to claim 7, the operations further comprising:
before obtaining the matching degree:
obtaining the to-be-located text;
obtaining a text vector sequence according to the to-be-located text, the text vector sequence comprising one or more word vectors, each word vector corresponding to one word;

encoding each word vector in the text vector sequence to obtain a text feature; and generating the text feature set according to the one or more text features based on the encoding.

12. The computing device according to claim 11, wherein the encoding comprises:

obtaining the text feature, comprising:

$$h_t = \text{LSTM}(w_t, h_{t-1}),$$

wherein $h_t$ represents a $t^{th}$ text feature in the text feature set, LSTM( ) represents performing encoding by using a Long Short-Term Memory (LSTM) network, $w_t$ represents a $t^{th}$ word vector in the text vector sequence, and $h_{t-1}$ represents a $(t-1)^{th}$ text feature in the text feature set.

13. A non-transitory computer readable storage medium storing instructions that, when executed by one or more processors of a computing device, cause the one or more processors to perform operations comprising:

determining one or more regions in an image, each of the regions corresponding to a respective candidate object in the image;

generating a set of semantic information for the one or more regions, each semantic information having a one-to-one correspondence with a corresponding candidate object in one of the one or more regions;

obtaining a strength of a connecting edge between two pieces of semantic information within the set of semantic information;

normalizing the strength of the connecting edge between the two pieces of semantic information within the set of semantic information to obtain a normalized strength;

determining a target connection matrix according to normalized strengths between pieces of semantic information within the set of semantic information;

determining a set of enhanced semantic information corresponding to the target connection matrix using a graph convolutional network (GCN), each enhanced semantic information having a one-to-one correspondence with a corresponding one of the set of semantic information, the GCN being configured to build an association relationship between various pieces of semantic information;

obtaining a matching degree between a text feature set corresponding to a to-be-located text and each of the respective enhanced semantic information using an image region locating network model, the image region locating network model being configured to determine a matching relationship between the image candidate region and the to-be-located text, each word in the to-be-located text corresponding to one word feature in the text feature set; and determining a target image candidate region from the one or more regions according to the matching degree between the text feature set and each of the respective enhanced semantic information.

14. The non-transitory computer readable storage medium according to claim 13, wherein generating the respective semantic information comprises:

obtaining the respective semantic information for each of the regions using a convolutional neural network (CNN), each of the regions comprising position and size information of the respective candidate object in the region.

* * * * *